United States Patent
Miles et al.

(10) Patent No.: US 7,526,444 B2
(45) Date of Patent: Apr. 28, 2009

(54) INTEGRATED TRADING INFORMATION PROCESSING AND TRANSMISSION SYSTEM FOR EXEMPT SECURITIES

(75) Inventors: Douglas Miles, Princeton, NJ (US); Jacob Ginder, Watchung, NJ (US)

(73) Assignee: Globalprivatequity.com, Inc., Princeton, NJ (US)

( * ) Notice: Subject to any disclaimer, the term of this patent is extended or adjusted under 35 U.S.C. 154(b) by 630 days.

(21) Appl. No.: 11/143,710

(22) Filed: Jun. 3, 2005

(65) Prior Publication Data
US 2005/0283417 A1    Dec. 22, 2005

Related U.S. Application Data

(60) Provisional application No. 60/576,428, filed on Jun. 3, 2004.

(51) Int. Cl.
*G06Q 40/00* (2006.01)
(52) U.S. Cl. .......................................... 705/35; 705/37
(58) Field of Classification Search ................... 705/35, 705/37, 39
See application file for complete search history.

(56) References Cited

U.S. PATENT DOCUMENTS

| | | | |
|---|---|---|---|
| 4,953,085 A * | 8/1990 | Atkins | 705/36 R |
| 5,819,238 A | 10/1998 | Fernholz | |
| 6,219,650 B1 * | 4/2001 | Friend et al. | 705/36 R |
| 7,243,081 B2 * | 7/2007 | Friend et al. | 705/1 |
| 2001/0044766 A1 | 11/2001 | Keyes | |
| 2003/0093360 A1 | 5/2003 | May | |

OTHER PUBLICATIONS

International Search Report of PCT/US 06/21775 mailed Dec. 18, 2006.

* cited by examiner

*Primary Examiner*—Kambiz Abdi
*Assistant Examiner*—Lindsay M. Maguire
(74) *Attorney, Agent, or Firm*—Patton Boggs LLP

(57) ABSTRACT

A system is provided for processing and transmitting trading information for exempt securities or assets not otherwise listed, traded, valuated or bought/sold in any conventional exchange or system for the regulation of securities or commodities. The system may include: (a) a risk analytic module using the latest market prices and data provided by other modules, (b) an auction module including asset auction functionality and a multi-lateral counterparty trade workstation capability, with bid-offer and unique asset price sourcing capabilities, (c) an asset or portfolio tracking module providing browser based, realtime consolidated reporting of multi-firm asset positions (public or private), and (d) an out-of-band communications module alerting users/subscribers who may or may not be logged on the system via fax, e-mail, text messages, or other out-of-band communications of a pending transaction being consummated or achieved.

40 Claims, 40 Drawing Sheets

Figure 4F1
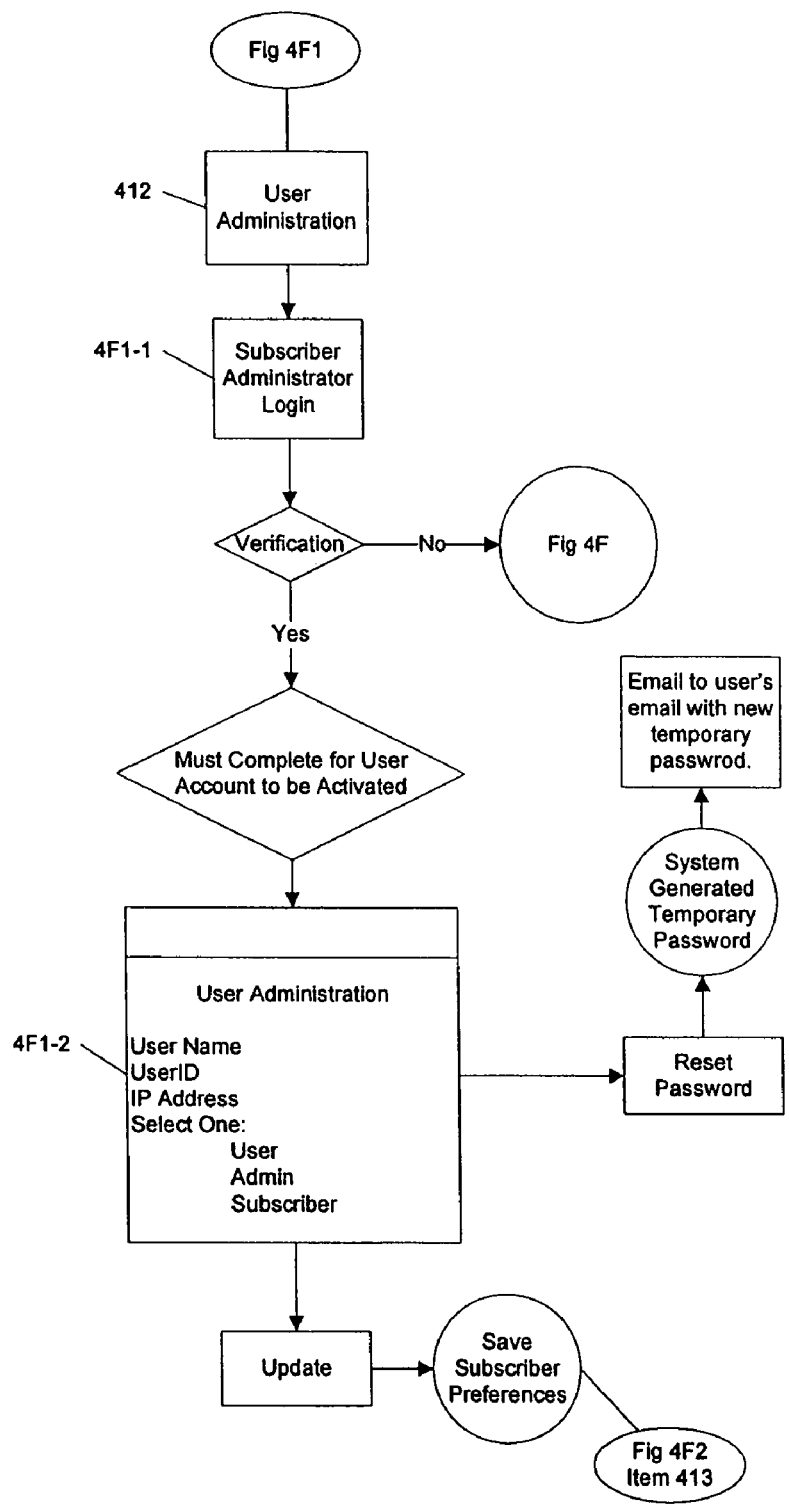

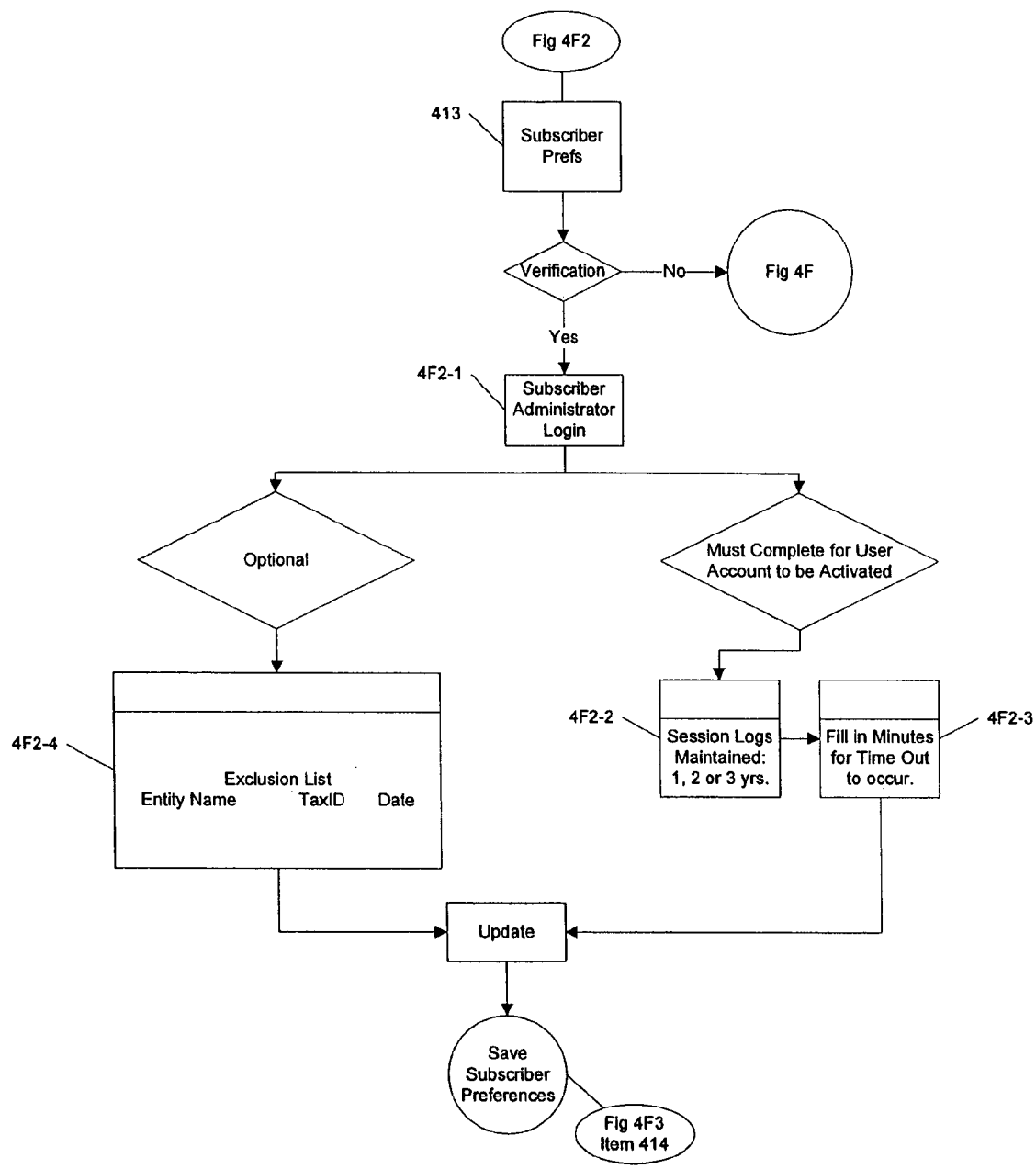
Figure 4F2

Figure 4F3
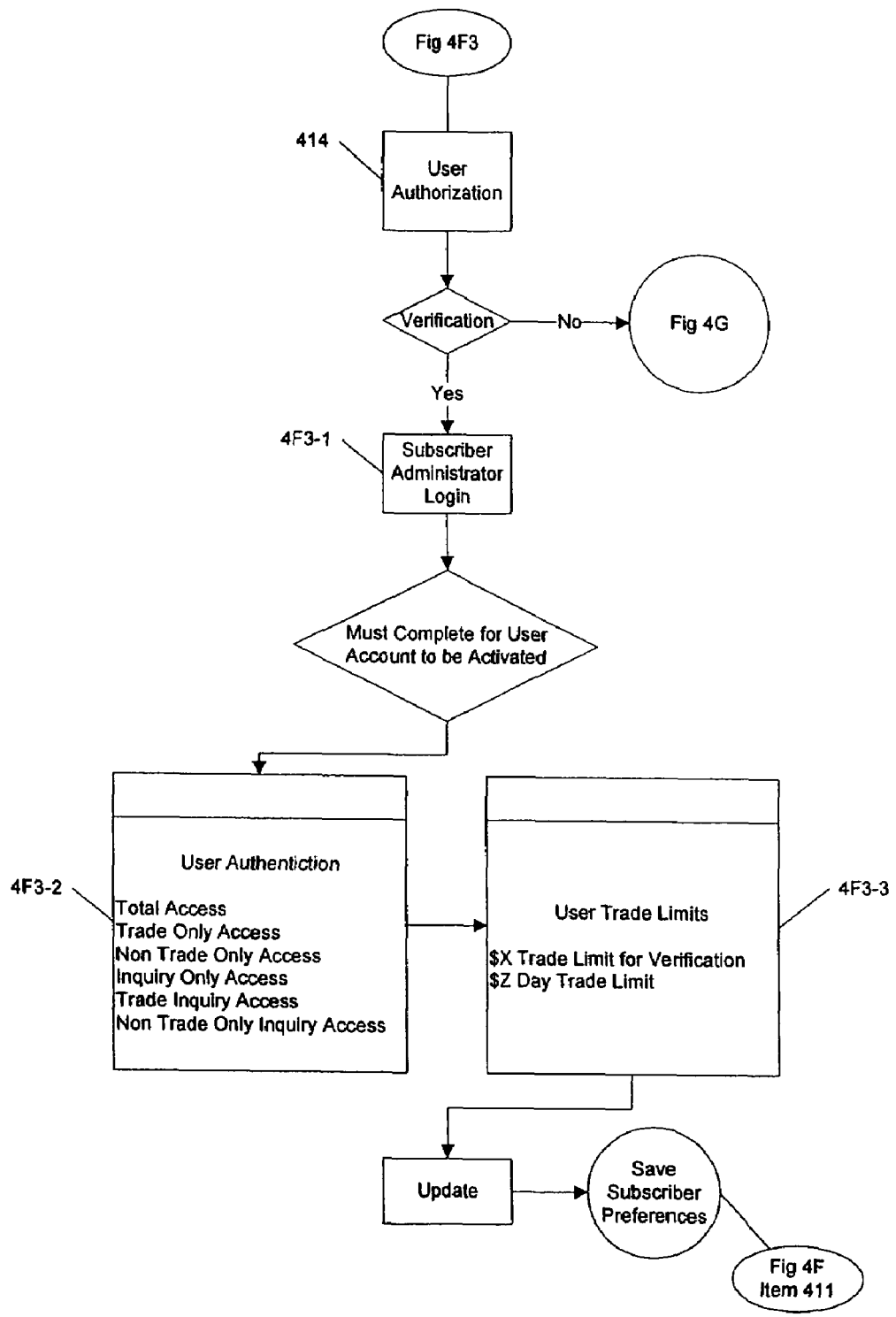

Figure 4F4
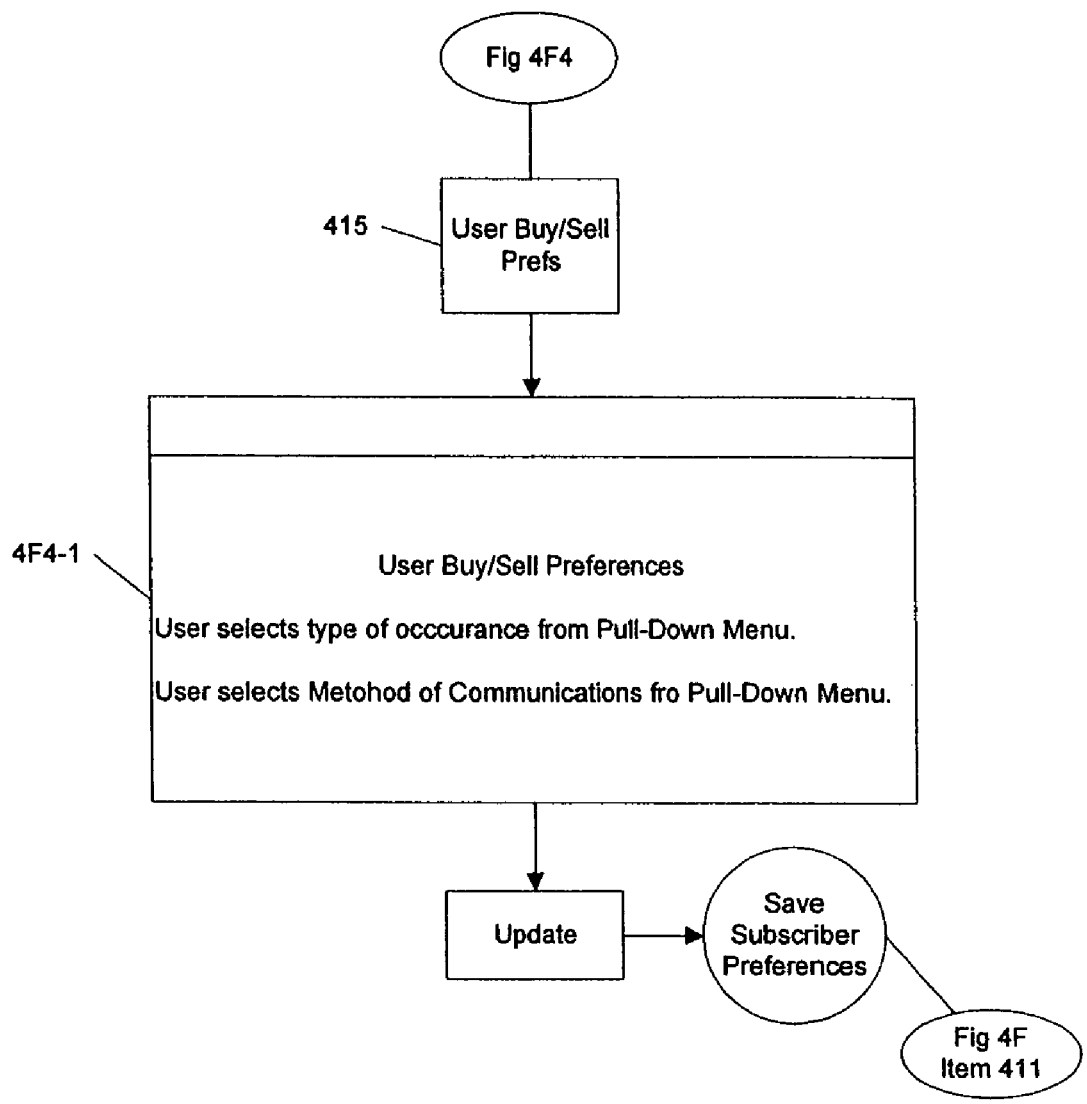

Figure 4F5
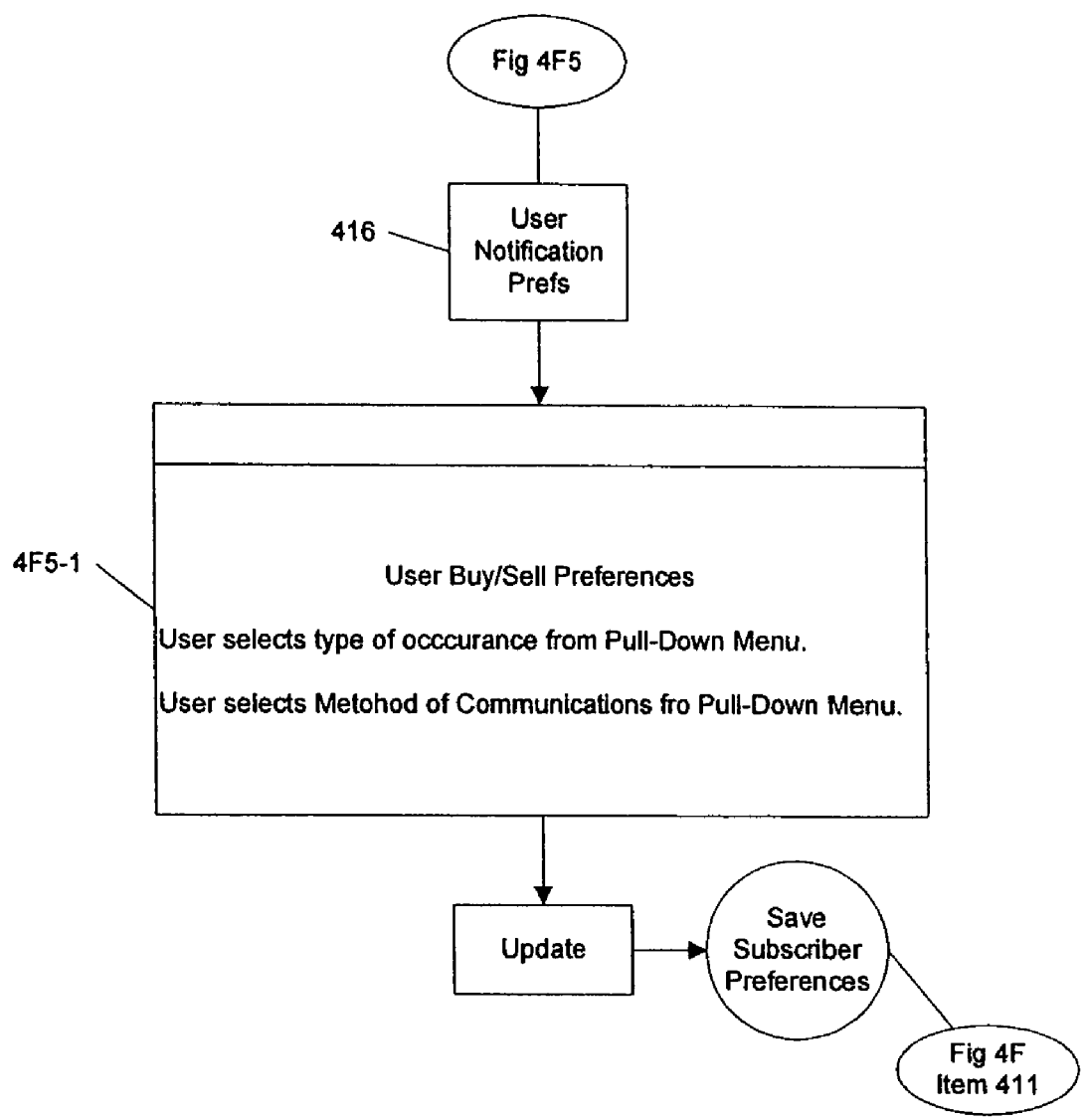

INTEGRATED TRADING INFORMATION PROCESSING AND TRANSMISSION SYSTEM FOR EXEMPT SECURITIES

This application claims the benefit of the priority under 35 USC §§119 and 120 of U.S. Provisional Application No. 60/576,428 filed Jun. 3, 2004, the entire disclosure of which is hereby incorporated by reference.

BACKGROUND OF THE INVENTION

1. Field of the Invention

The present invention relates to a risk/valuation analytics system combined with a financial asset trading information processing and transmission system for conducting electronic transactions, and optionally tracking asset portfolios, executable on a global information network. More particularly, this invention is directed to a financial trading information processing and transmission system comprising a multilateral counterparty trade module, an auction module, and optionally an asset tracking module, and a risk metric and analytical tool module, said auction module and multilateral counterparty trade module are particularly designed for conducting interactive online trading in unregistered and exempt securities that allows participants (i.e., bidders) to modify or withdraw their bids up to a certain point prior to acceptance by the seller, and sellers to withdraw their offers prior to a certain point.

2. Discussion of the Related Art

Currently, discovery and sourcing of alternative asset, private equity fund and global money market or fixed income instrument prices on a periodic basis lacks standardization and automation worldwide. Large pension systems or insurance company holdings of these assets totaling billions have almost no reliable method of achieving efficient price discovery and/or risk metrics both being correctly valued let via an automated solution. There is currently no solution set representing a move towards standardization, automation, and true bid/offer market testing of specific asset values and/or secondary market prices combined with risk analysis in these enormous and sometimes less liquid markets.

Further, there is a need to eliminate manual price data entry or 'flat digital file' price data transfer to the digital record book periodically—affecting an over $3.0 trillion dollar asset market and saving thousands of man-hours annually spent sourcing and entering illiquid asset price data by institutional investors, or their custodians and representatives.

In particular, the top 1000 institutional investors worldwide and top 200 global private equity money market and fixed income investors, or their fiduciaries, as well as Sarbanes-Oxley and LAB Rule 39 sensitive issuers and fund syndicators could benefit from a thorough and rigorous approach to pricing and accounting issues for all privately placed and exempt assets. The inventor is not aware of any single or integrated financial analysis and transaction support technology that addresses all of these needs.

Presently it is not possible to operate a twenty-four hour per day, seven day per week exempt securities trading system involving a plurality of financial packages and diverse asset groups directed at a plurality of remotely disposed bidders and sellers. Further, the inventor is not aware of an interactive electronic environment comprising a risk analysis module, an auction module, a multilateral party module and associated transaction support technologies such as an asset tracking module, and optionally a proprietary analytical tool module directed at the global exempt securities market.

SUMMARY OF THE INVENTION

To address the shortcomings of the current methods of trading in exempt securities and unlisted assets, and to provide full digital sourcing, delivery, reporting and settlement for all alternative and exempt assets, the present invention provides, in a computer network enabling communication between a host computer and a plurality of remote bidders and sellers, a system for processing and transmitting trading information incorporating (a) a risk analytic module using the latest market prices and data provided by the other two modules, (b) an auction module comprising a private asset auction functionality and a two way trader workstation capability, with bid-offer and unique asset price sourcing capabilities, (c) an asset or portfolio tracking module to provide browser based, real-time consolidated reporting of multi-firm asset positions (public or private), and (d) an out-of-band communications module which alerts users/subscribers who may or may not be logged on the system via fax, e-mail, or text messages of a pending transaction being consummated or achieved.

Both the auction module and the multilateral trade module comprise a browser based trading system including an offering display means (i.e., a computer monitor or other display) for summarizing an inventory of available securities, bidding means on a bid workstation available to the bidders for submitting a plurality of bids across the network, and an accepting display means on a bid workstation available to the sellers for reviewing and accepting a plurality of bids sent across the network by the plurality of bidders.

The present invention further provides, in a computer network enabling communication between a host computer and a plurality of remote bidders and sellers, a transaction information processing and transmission system implemented as a computer program within the host and network, comprising, a financial inventory database connected in communication with the host for storing financial information, the financial information being descriptive of the nature and type of securities available for purchase by a customer, a bid database in communication with the host for storing bid information, the bid information being descriptive of bid received from one of the remote customers, a trading manager implemented in a server and in communication with the databases, a personal account manager in communication with the trading manager and the bid database, a bid modifier means allowing for the modification or withdrawal of bids or offers up to a certain point, incorporated in the trading manager and in communication with the bid database, wherein the trading manager allows a bidder to modify or withdraw their bids up to a certain point prior to acceptance, and a seller to modify their offers up to a certain point prior to bidding or following a no-bidder.

In a preferred embodiment, the bidder views an inventory screen comprising an inventory of exempt or unlisted assets available across the network for sale and sends a bid across the network, wherein a bid modifier allows modification or withdrawal of the bid up to a certain point. The bid database which is in constant communication with the bid modifier stores the bid, the trading manager determines whether the bid has been accepted by the seller, and updates the asset offering inventory accordingly, the personal account manager notifies the bidder whether the bid was accepted by the seller, and the out-of-band communications module does the same via a different a different communications device or medium chosen by the user.

One object of the present invention is to provide an interactive medium that gives remotely disposed sellers and bidders more flexibility and control during an online transaction. Another object of the present invention is to provide a bidding environment unrestricted by local business hours or physical proximity.

Another object of the present invention is to provide proprietary risk metrics and analytical tools that would allow buyers and sellers to quickly and efficiently evaluate, analyze and price all offerings on the system and which uses actual market price data being created by the system.

Yet another object of the present invention is to provide the seller the ability to consider a plurality of bids submitted by remotely disposed bidders and to concurrently participate in a bidding activity of their own with other remotely disposed sellers. In another embodiment of the present invention, a buyer or seller would log on in a computer enabling network environment, be presented with a inventory screen listing product information and pricing parameters. A customer who desires to bid or offer would then be taken electronically to a bid workstation menu to participate in the online trading process. This bid workstation would list all products available in the specified class of securities for which trading is desired.

It is a further object of the present invention to provide an interactive electronic financial trading system over a global information network involving both the bid modifier means aforesaid, and an offering modifier means allowing a prospective seller to modify their asking price in the event of non-acceptance of the plurality of bids.

It is yet another aspect of the invention, to provide a user/subscriber to the trading information processing and transmission system with an integrated financial transaction support technology optionally incorporating a browser-based portfolio accounting, performance, and measurement system enabling real time portfolio valuation, measurement, and reporting.

One of the most unique functionalities afforded by the system of the present invention is that the actual assessment analysis of risk factors, pricing and valuation are influenced by the changing incoming live market data and workstation of the transaction module.

It is to be understood that both the foregoing general description and the following detailed description as well as the appended drawings are exemplary and explanatory and are intended to provide further explanation of the invention as claimed. Additional features and advantages of the invention will be apparent from the description, or may be learned by practice of the invention.

BRIEF DESCRIPTION OF THE DRAWINGS

The appended drawings set forth some exemplary features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4F1 shows a system block diagram or flow chart illustrating the functional operation of the user administration sub-procedure in a global information network implementation of the present invention;

FIG. 4F2 shows a system block diagram or flow chart illustrating the functional operation of the entity subscriber preferences sub-procedure in a global information network implementation of the present invention;

FIG. 4F3 shows a system block diagram or flow chart illustrating the functional operation of the entity subscriber authorization sub-procedure in a global information network implementation of the present invention;

FIG. 4F4 shows a system block diagram or flow chart illustrating the functional operation of the user buy/sell preferences sub-procedure in a global information network implementation of the present invention;

FIG. 4F5 shows a system block diagram or flow chart illustrating the functional operation of the user notification sub-procedure in a global information network implementation of the present invention;

FIG. 5 shows a system block diagram or flow chart illustrating the functional operation of the notification function in a global information network implementation of the present invention;

DETAILED DESCRIPTION OF THE PREFERRED EMBODIMENTS

Reference will now be made in detail to the preferred embodiments of the invention. This invention may, however, be embodied in many different forms and should not be construed as limited to the embodiments set forth herein.

The interactive electronic trading information processing and transmission system of the present invention may be used for trading exempt securities comprising whole loan pools on both a bulk and a flow basis. The whole loan market includes aggregated mortgage loan pools comprising sub-prime and high loan-to-value ratio loans; loans with conforming and non-conforming principal balances; home equity loans; and mortgage servicing rights. These products can be bought and sold through either a bid/ask process or a standing buy order. Coupled with proprietary financial analytical tools, buyers and sellers can quickly and efficiently evaluate, analyze and price all offerings.

The interactive electronic trading information processing and transmission system of the present invention may also be used for trading exempt securities directed at large unlisted asset secondary markets having no active price discovery mechanisms such as leveraged buyout finds or LPs both fixed income and private equity linked, comprising whole loan pools on both a bulk and a flow basis. The interactive electronic trading information processing and transmission system of the present invention may also be used for trading exempt securities directed at large unlisted asset secondary markets needing periodic, planned and staged liquidity or repricing events for major sell-side owners of unlisted asset groups.

The interactive electronic trading information processing and transmission system of the present invention may also be used for trading any exempt or unlisted assets that are not otherwise listed, traded, valuated or bought/sold in any conventional exchange or system for the regulation of securities or commodities. Such assets may include but are not limited to the above example assets, along with artwork, one-of-a-kind collectables, antiques, and securities being traded in like-kind exchanges (no cash transfer).

Figure 1:
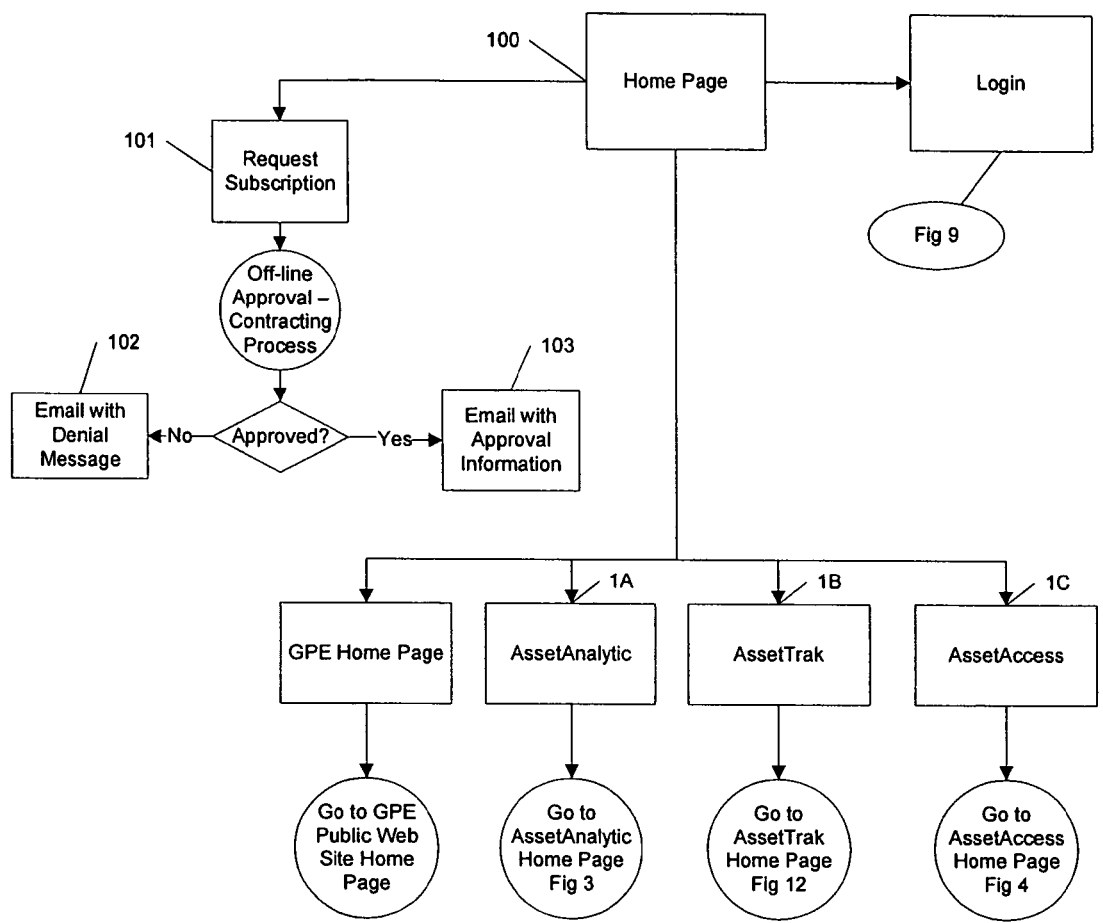
FIG. 1 shows a system block diagram or flow chart illustrating the functional operation of the home page in a global information network implementation of the present invention.

FIG. 1 shows one embodiment of a home page for the implementation of the invention in a global information network that is representative of the systems schematic of the integrated interactive electronic trading information processing and transmission system of the present invention that comprises, among other elements, an asset analytic module 1A, an asset track module 1B, and an asset access module 1C.

Figure 2:
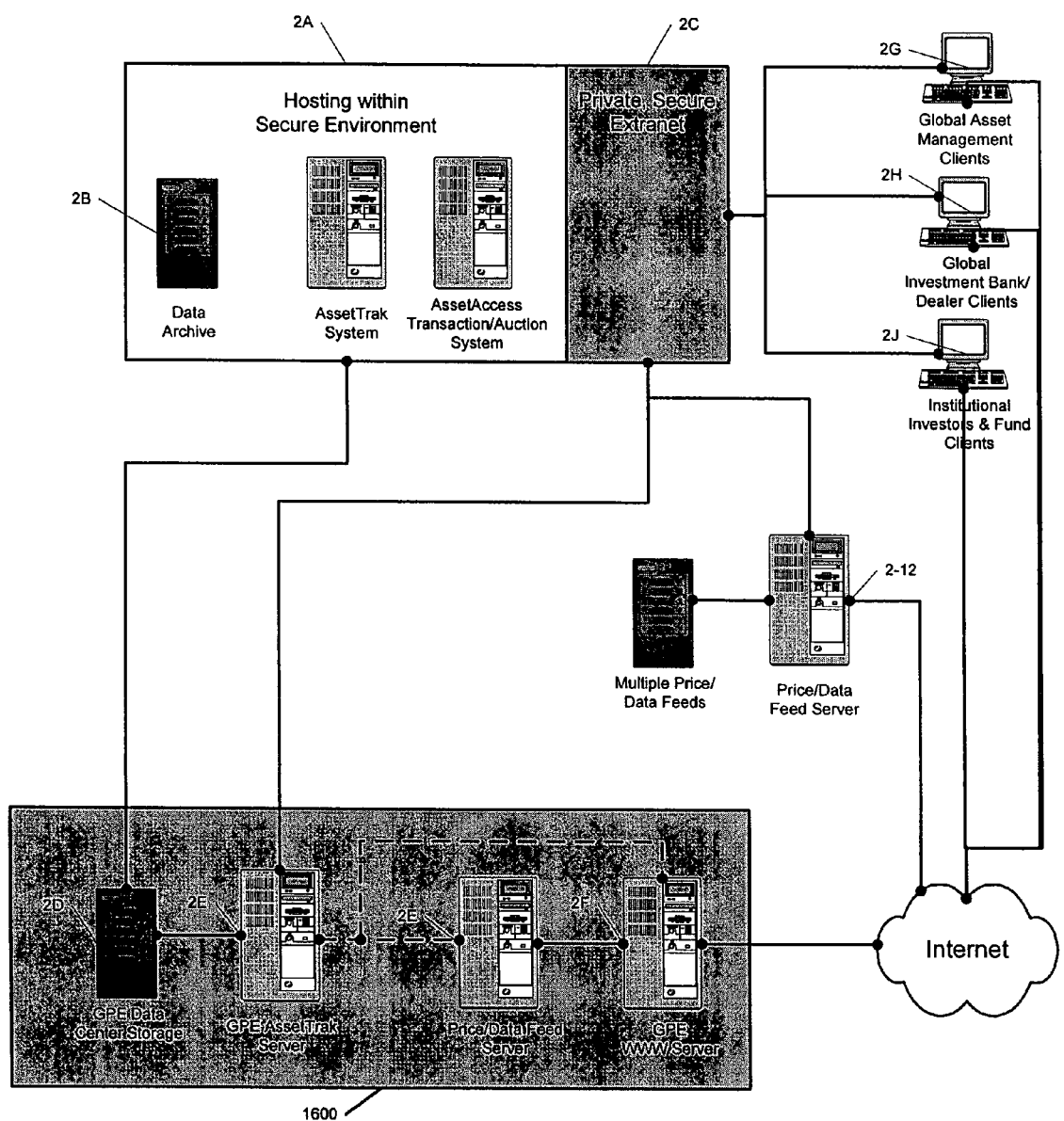
FIG. 2 shows a hardware/software system schematic that illustrates an example implementation of the present invention on a global information network.

FIG. 2 shows the systems schematic of the integrated interactive electronic trading information processing and transmission system of the present invention implemented in browser-based subscriber services, preferably on desktops, for trades or bids/offers, providing services comprising the price discovery mechanisms of the asset auction module of the present invention, integrally linked with asset pricing data tracking and entry, which further provide information comprising pricing updates, position reports, portfolio evaluation, capital utilization and reserve requirements that preferably go directly to institution's or subscriber's record book via common browser databases. The price action and reporting capabilities of the electronic trading information processing and transmission system of the present invention expands the price transparency, entries, and accuracy of the reporting and service functionalities of the integrated financial transaction support system.

In particular, a central server 1600 implements the asset track module 1B, the asset access module 1C and a data archive 2B which stores the data in a secure environment 2A. Data is inputted into outputted from the secure environment 2A via secure system, such as a private secure extranet 2C in order to insure the integrity of the data into/out of the data archive 2B. Data may originate from or be exchanged with many sources, including but not limited to an asset track server 2E, a price/data feed server 2I internal to the server 1600, a price/data feed server 2-12 that is external to the server 1600, a global cash futures subscriber 2J, a global pension subscriber 2H, a global money market subscriber 2G. In addition, data may be exchanged with the secure environment 2A through the Internet or World Wide Web by communicating with a WWW server 2F that connects to the asset track server 2E, which then connects to the secure extranet 2C. The data from the data archive 2B is physically stored in a data center 2D that connects to the asset track server 2E.

Figure 3:
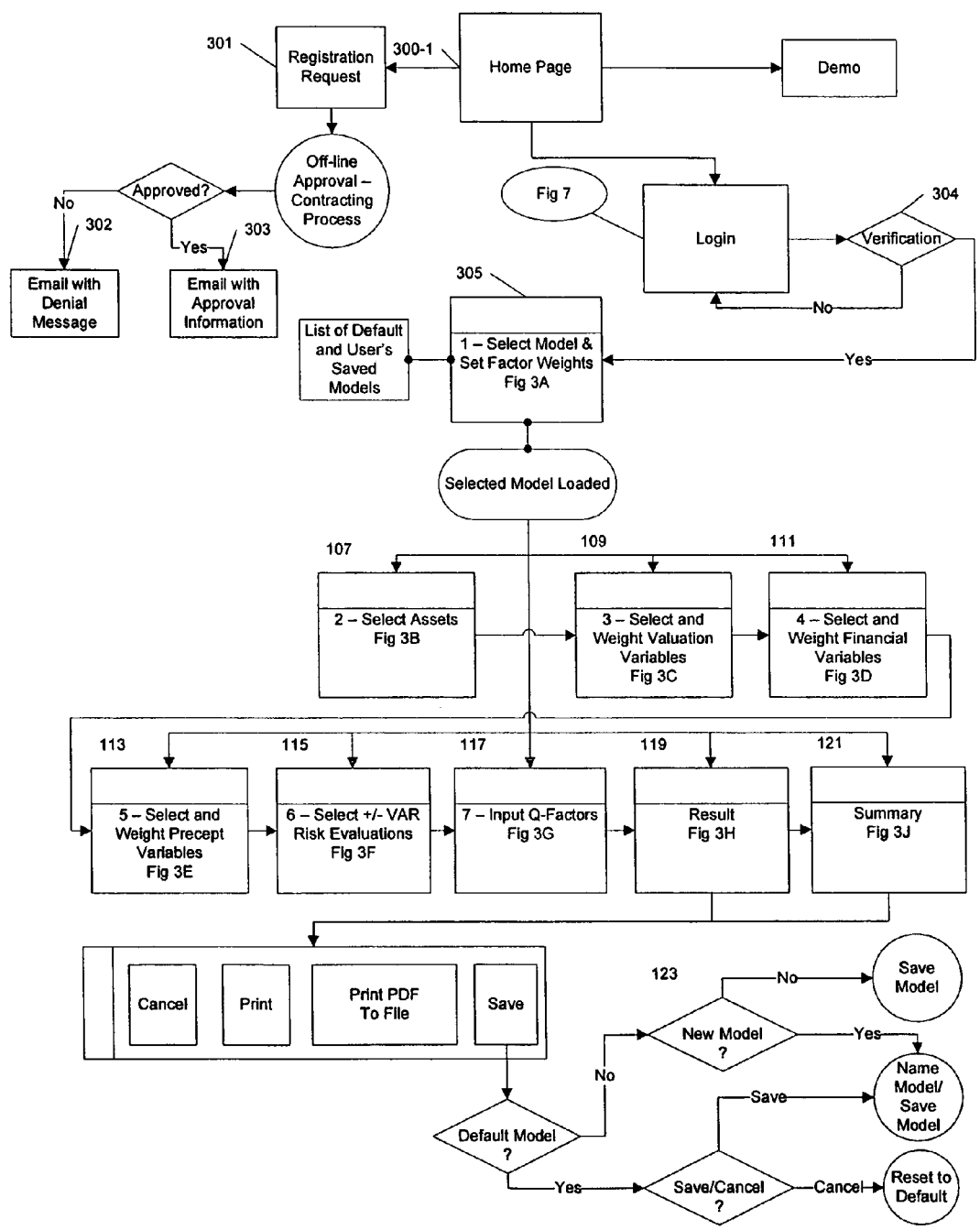
FIG. 3 shows a system block diagram or flow chart illustrating the functional operation of the home page of the asset analytic module in a global information network implementation of the present invention.

As illustrated by FIG. 3, the function of the asset analytic module 1A is to provide a user a system by which he/she can track, compare and analyze his/her investment assets or third party investment assets using both quantitative and qualitative measures that she/she as the user can select, define and weight according to his/her investment strategies or other requirements. The quantitative measures includes publicly available financial data, such as through the Internet or World Wide Web, private financial data such as from secure, privately-held databases, or even data manually inputted by the user or by the owners of the server that maintain the data center 2D.

Using the software implementation of the asset analytic module 1A as an example, in the asset analytic operation, the user selects a model of an asset that he/she wishes to analyze and analyze the factor weights associated with that model, as shown in operation 305. A model is an established set of numerical parameters that represent various factors believed to be representative or indicative of how a particular type of asset is valuated or measured. Each numerical parameter is weighted depending on the degree to which the factor that the parameter represents affects the type of asset it defines. The numerical parameters are then added together to form a weighted sum average. To the user, that weighted sum average thus becomes in effect a statistical or quantitative measure that the user can then compare with other similar assets, or monitor in order to observer any change in the valuation or measure of the asset or type of asset over time.

A model may be predefined for different types of assets, such as private equity funds as used in the drawings as an example, or a user may create a model based on his/her definition or understanding of the factors applicable to a particular asset or type of asset. The weighted sum average applicable to a particular model is first divided up between a measure of quantitative factors and a measure of qualitative factors, both expressed are percentages, that then when added together the result is a number that should not exceed 100%. Using the example of a private equity fund model, the qualitative factors will form 50% of the weighted sum average, while the qualitative factors will form the other 50% of the weighted sum average. Examples of quantitative factors include valuation variables and financial variables that together add up to the 50% attributable to quantitative factors. Examples of qualitative factors include precepts known about the asset or type of asset, +/− VAR risk evaluations, and Q-factors (i.e., "wildcard" or other non-quantified characteristics or information) expressed in numerical values that when added to together add up into the other 50% of the weighted sum average attributable to qualitative factors. Models for other assets may be defined with different weights on the aggregate quantitative and qualitative factors, or with different weights on the individual factors that make up the aggregate quantitative and qualitative factors.

Figure 3A:
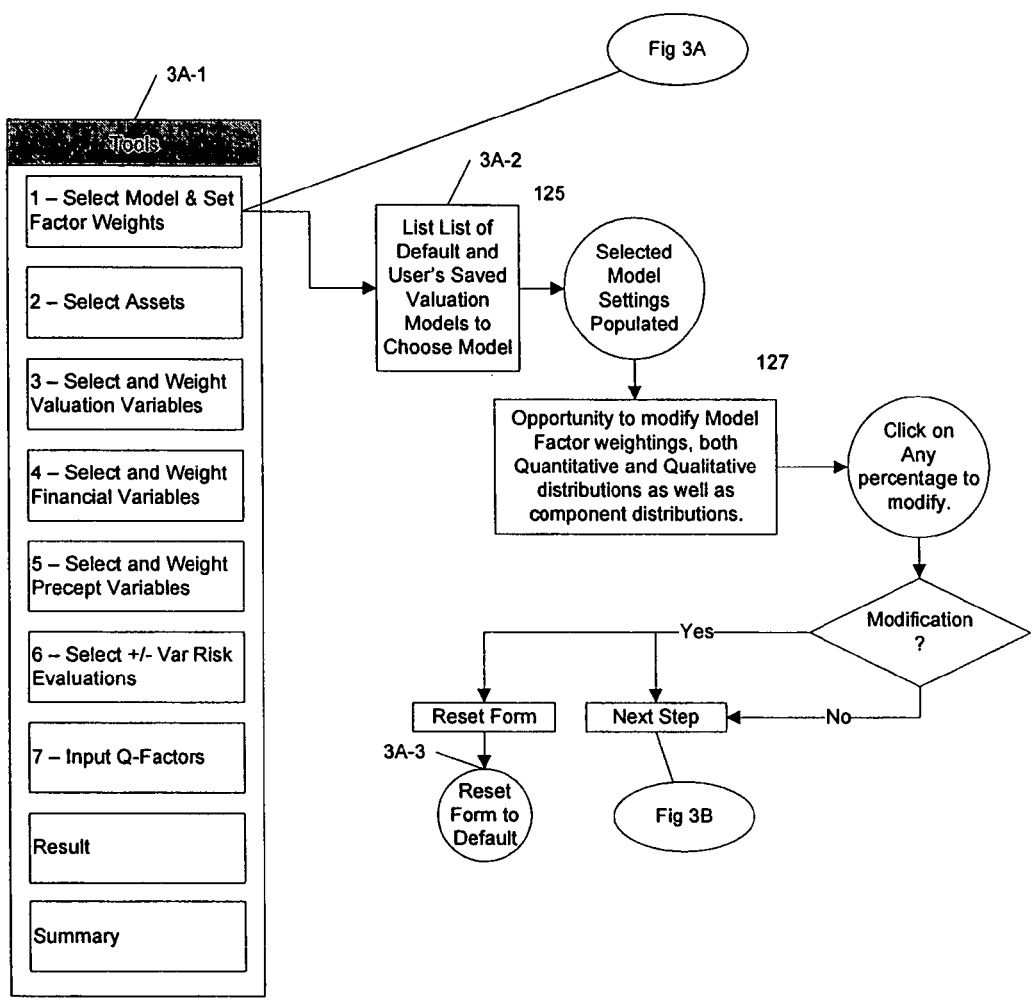
FIG. 3A shows a system block diagram or flow chart illustrating the functional operation of the select model and weight model factors procedure in a global information network implementation of the present invention.

As shown in FIG. 3A, in a software implementation, a user would first be allowed to view a list of default or previously saved models, and then to select or create a model (see operation 125). The user then is given an opportunity to input or modify any of the weightings attributable to the quantitative and qualitative factors of the selected or newly created model (see operation 127).

Figure 3B:
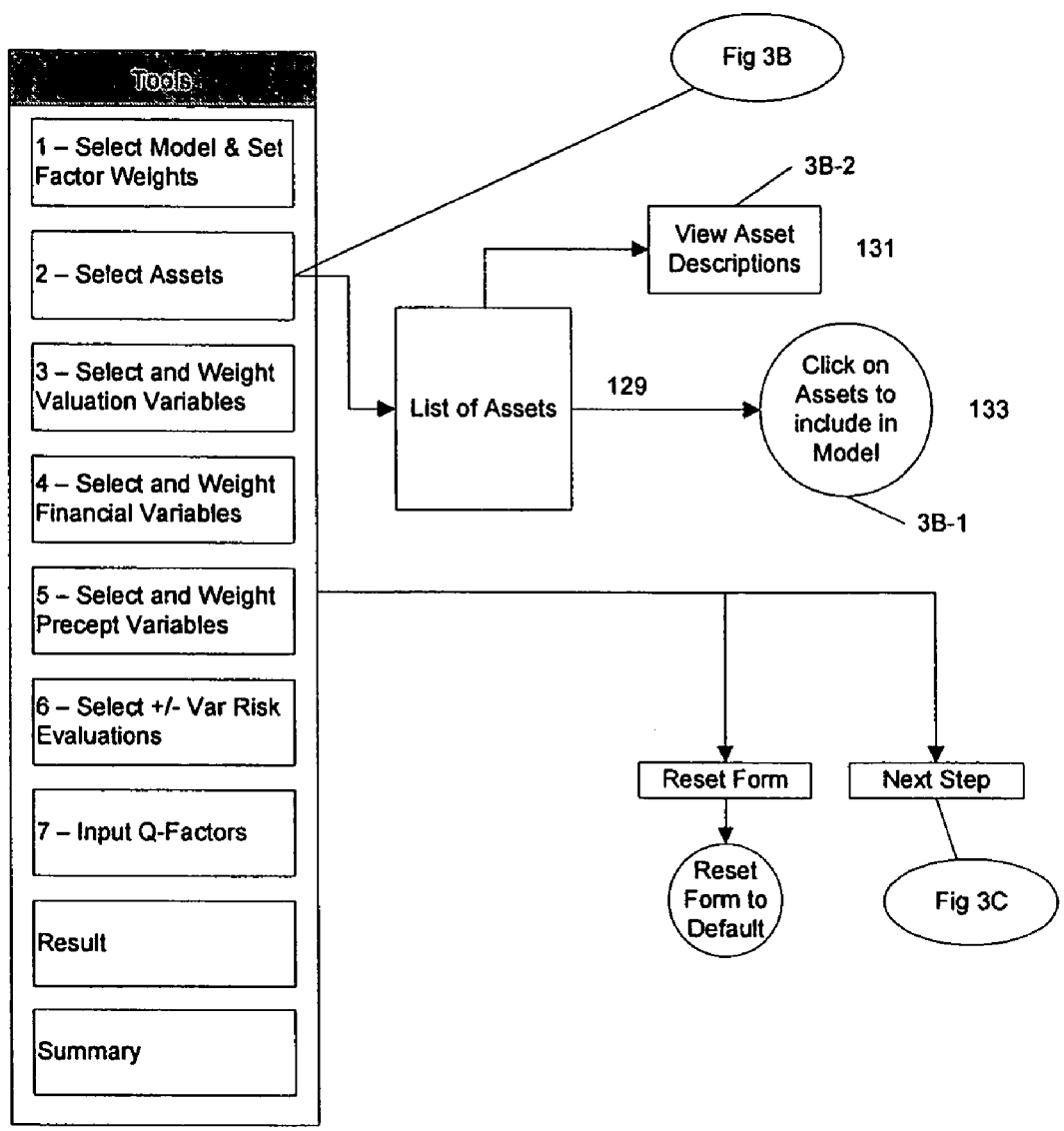
FIG. 3B shows a system block diagram or flow chart illustrating the functional operation of the select asset procedure in a global information network implementation of the present invention.

After a model is selected, as shown in FIGS. 3 and 3B, the user then selects the assets to apply to the selected model. In selecting the asset(s) to apply, the user is allowed to view a list of the assets that are available in the data center 2D (see operation 129), as well as any asset description data available from the data center 2D (see operation 131). Based on the available information from the data center the user then selects the asset(s) to apply into the model (see operation 133).

Figure 3C:
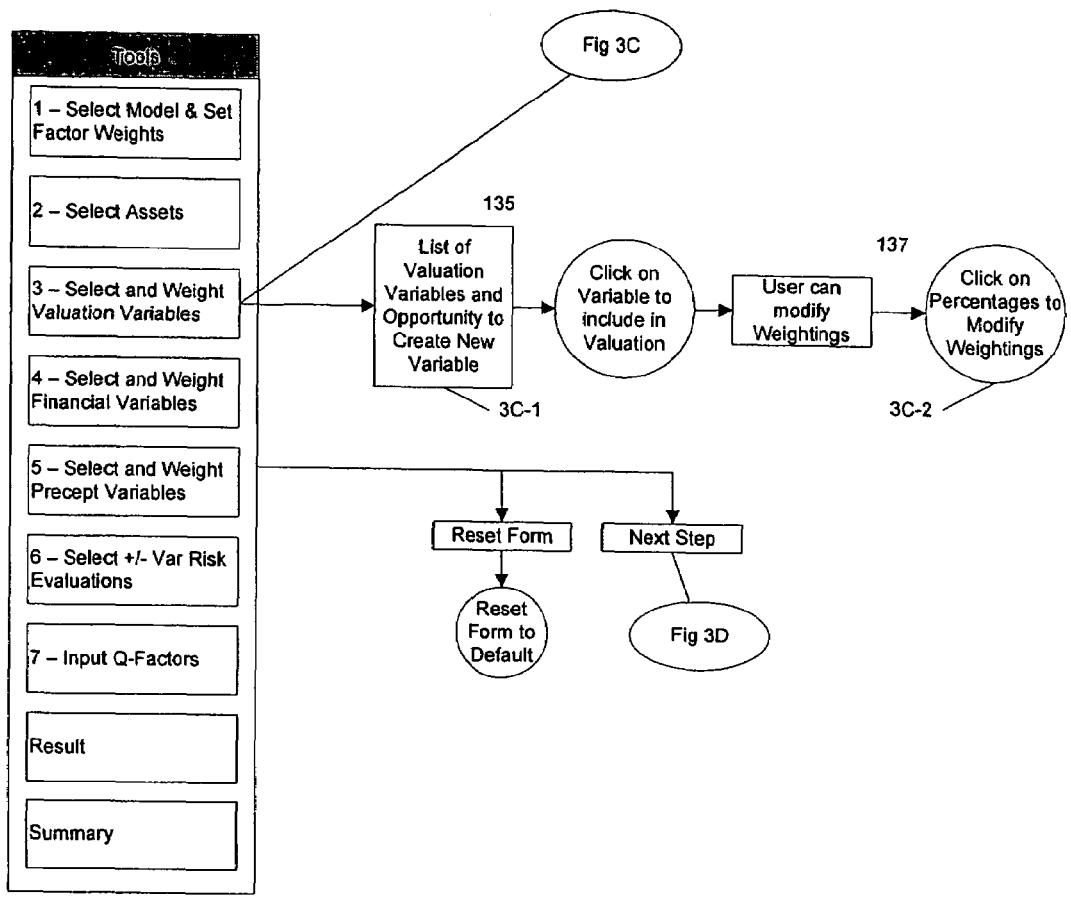
FIG. 3C shows a system block diagram or flow chart illustrating the functional operation of the select and weight valuation variables procedure in a global information network implementation of the present invention.

Referring to FIGS. 3 and 3C, the user then selects one or more valuation variables that together will form the numerical value of the valuation variable portion of the quantitative factor value (see operation 135). Using the private equity fund example, known valuation variables in the industry include distributions/NAV for a given year, fund IRR growth rate for a given year, fund distribution yield (LTM-Actual), fund % prem/discount to sector mean yield, latest period IRR, and premium to fund DCF value. Each of the selected valuation variables are weighted in accordance with any established definitions, such as for previously designed models, or modified as desired by the user (see operation 137).

Figure 3D:
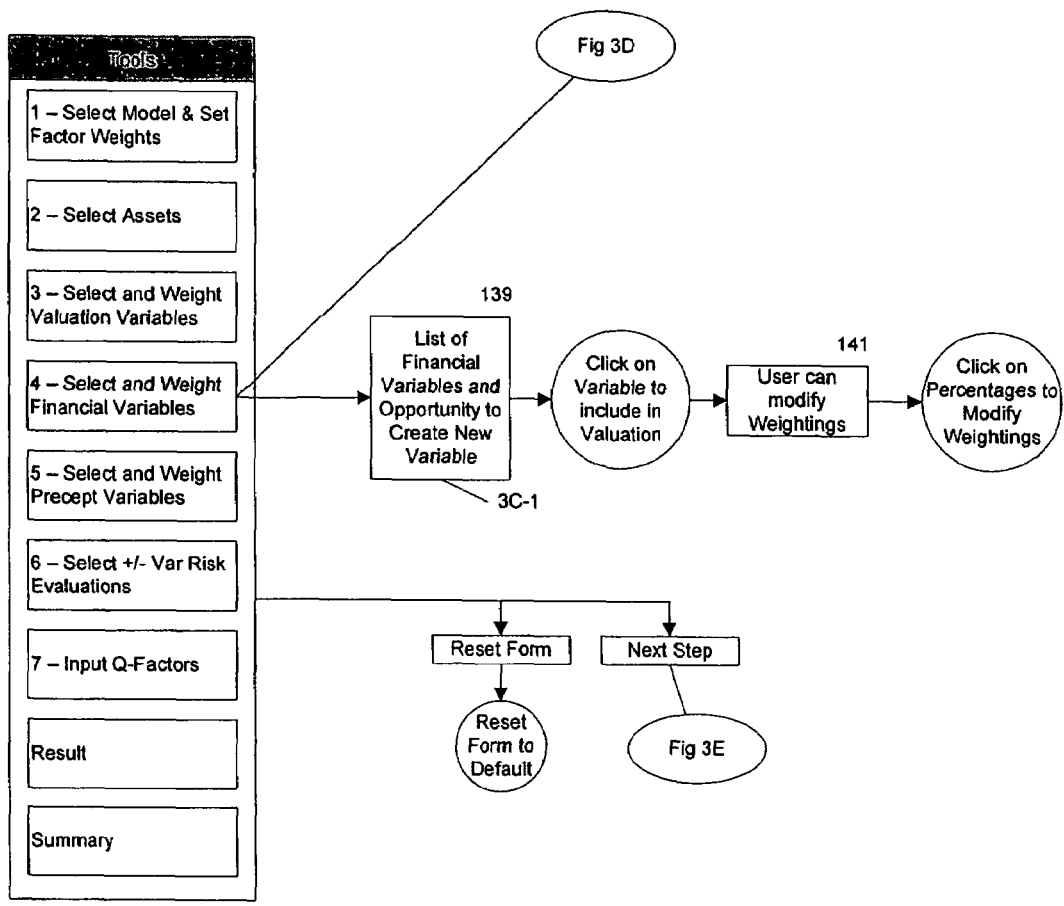
FIG. 3D shows a system block diagram or flow chart illustrating the functional operation of the select and weight financial variables procedure in a global information network implementation of the present invention.

According to FIGS. 3 and 3D, the user then selects one or more financial variables that together will form the numerical value of the financial variable portion of the quantitative factor value (see operation 139). Based on the private equity fund example, known financial variables in the industry include the distribution margin for a given year, the IIR Change vs. YAG for a given year, the funds organic IIR growth rate, and the IIR CAGR vintage year to a given year. Again, each of the selected financial variables are weighted in accordance with any established definitions, such as for previously designed models, or modified as desired by the user (see operation 141).

Figure 3E:
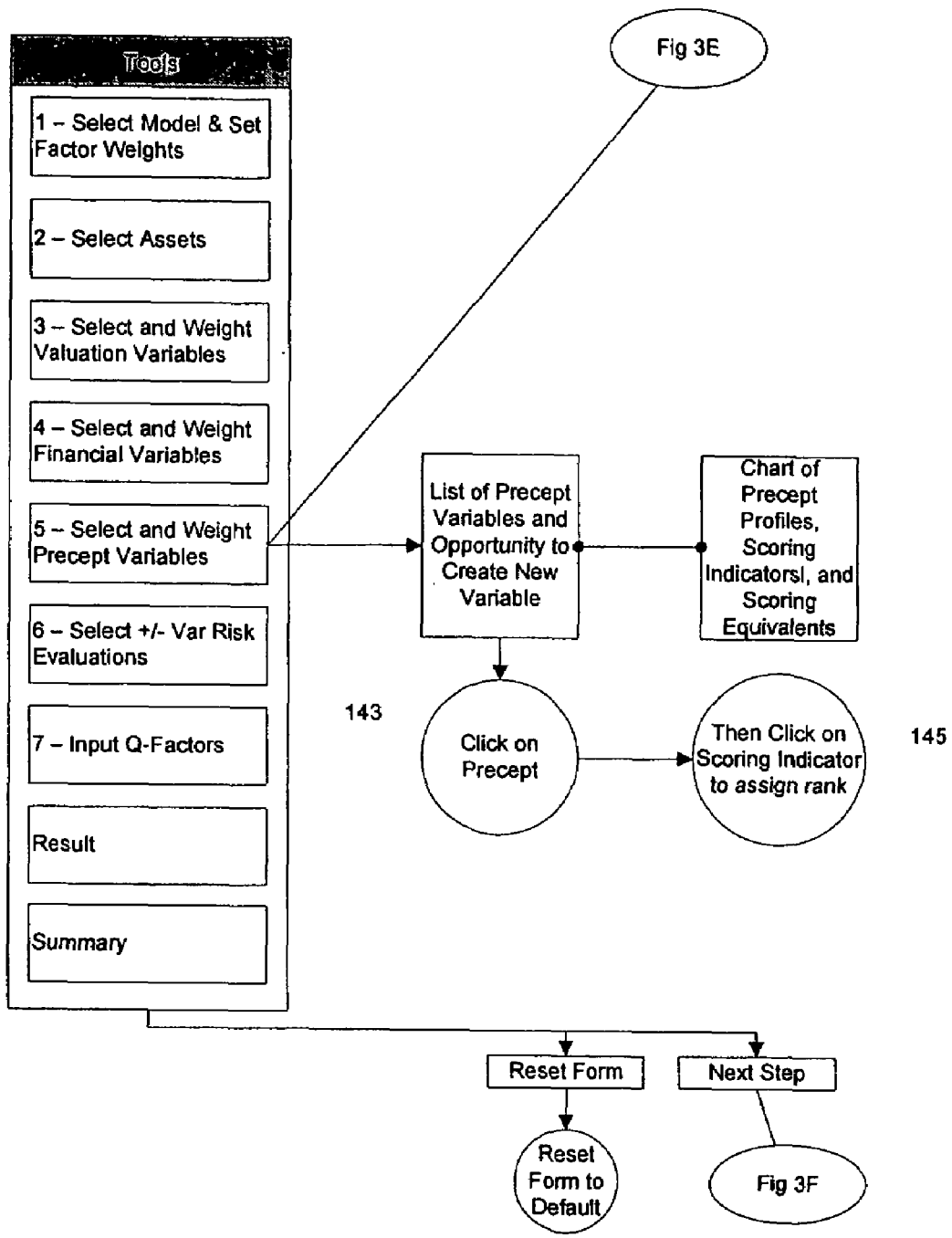
FIG. 3E shows a system block diagram or flow chart illustrating the functional operation of the select and weight precept variables procedure in a global information network implementation of the present invention.

Referring to FIGS. 3 and 3E, the user selects and weights precepts applicable to the selected asset, or the user can create other precepts applicable to the selected asset (see operation 143). Precepts are various intangible factors that are generally applicable to a particular type of asset. Such factors include, such as for private equity funds, an accretive GP investor, consistent strategy, cycle timing skill, founder leadership/ legacy, geographic diversity, industry diversity, long term focus, opportunistic GP, talent development culture, tiffany sector leadership, and vertical sector leadership. The user weights and ranks each of the selected precepts that will be applied to the selected or to all selected assets (if more than one), based on knowledge or information on the specific asset, to determine whether the selected precept will have a positive, negative or neutral impact on the aggregate precept variable value (see operation 145). In other words, for each asset, the weighting/ranking of a given precept may be different depending on how that particular precept applies to each asset. For example, based on industry information, private equity fund X may have a history of strong founder leadership and an established legacy or succession line, while private equity fund Y may have a history of mediocre leadership with no known line of succession. For fund X, the precept of founder leadership/legacy would have a positive contribution to the aggregate precept variable, while for fund Y, that precept may have a negative or at best a neutral contribution to the aggregate precept value for fund Y.

Figure 3F:
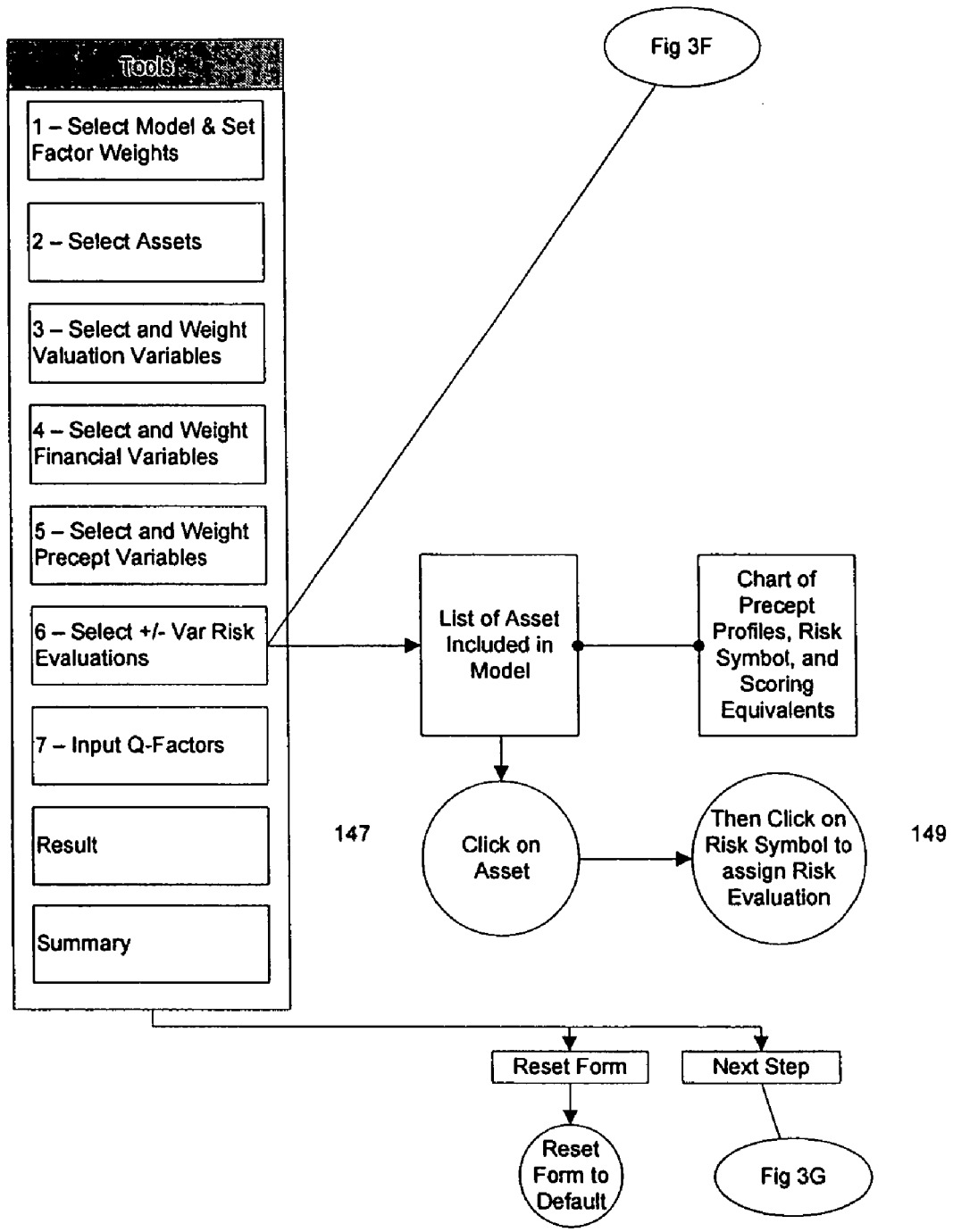
FIG. 3F shows a system block diagram or flow chart illustrating the functional operation of the select +/− VAR risk evaluations procedure in a global information network implementation of the present invention.

With respect to FIGS. 3 and 3F, the user will first select the asset to which a VAR risk factor will be applied (see operation 147). Then, the user selects and weights the VAR risk factors applicable to the selected asset (see operation 149). VAR risk factors are a predefined set of descriptions that characterize the risk level evaluation applicable to the selected asset. From best to worst, the different risk levels are no risk (None), funding (F), category sentiment (S), operating (O), funding and category sentiment (FS), operating and funding (OF), operating and category sentiment (OS), and all (FSO). Each of these risk levels is assigned a different scoring equivalent, either predefined or determined by the user that is then added to the aggregate qualitative factors. The weighting of each risk level that will be applied to the selected or to all selected assets (if more than one), based on knowledge or information on the specific asset, determines the degree to which the applicable risk level will impact the aggregate qualitative factors (see operation 145). In other words, for each asset, the weighting/ranking of the applied risk level is designed such that the lower the risk level, the higher the number or value that would be added to the aggregate qualitative factors; the higher the applied risk level, the lower the number of value that would be added.

Figure 3G:
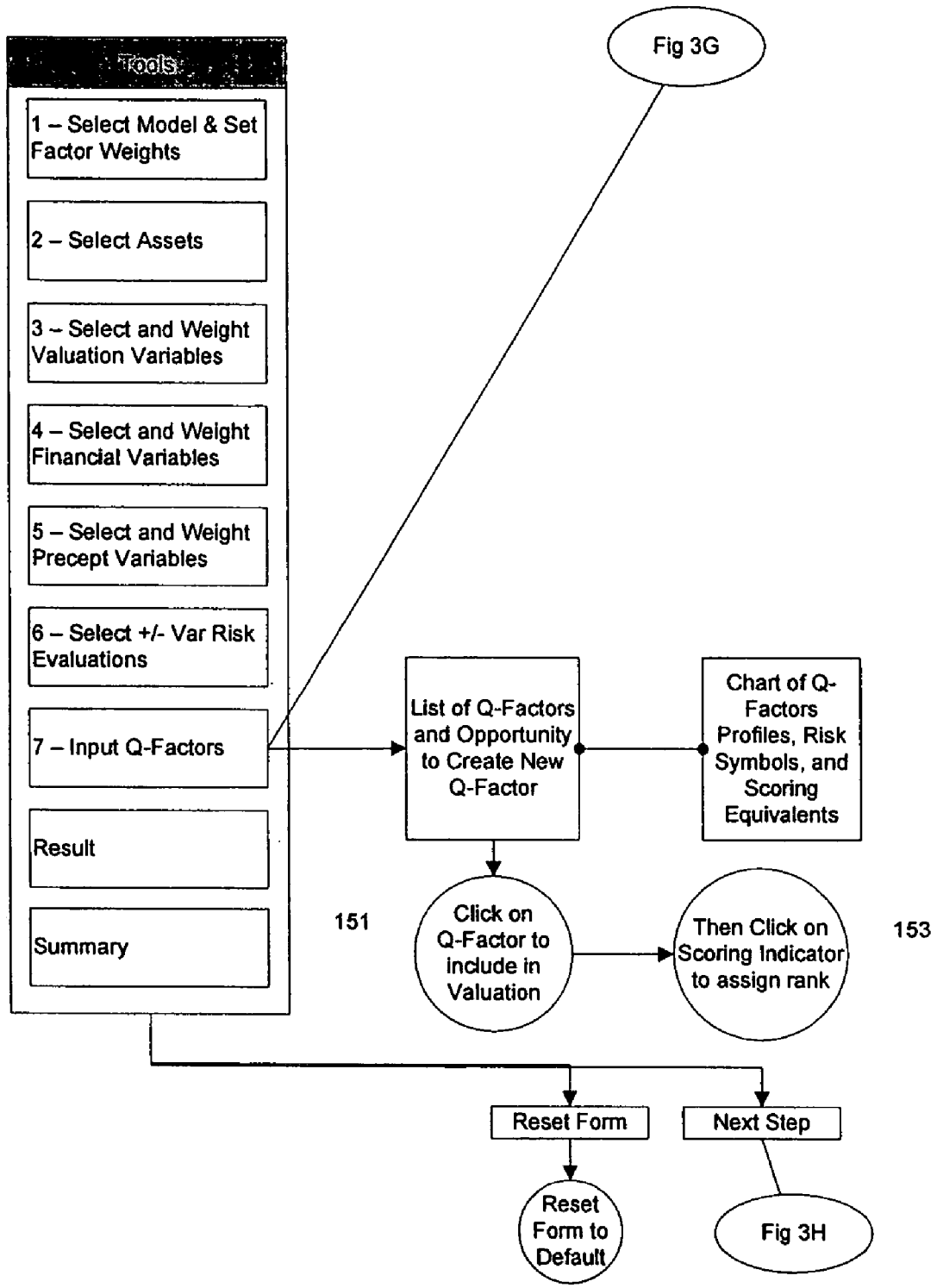
FIG. 3G shows a system block diagram or flow chart illustrating the functional operation of the input Q-factors procedure in a global information network implementation of the present invention.

Regarding FIGS. 3 and 3G, the user selects the asset to which the Q-factors will be applied, and then selects the Q-factors that are applicable to that asset (see operation 151). The user weights each Q-factor applicable to the selected asset, or the user can create other Q-factors applicable to the selected asset (see operation 153). Q-factors are various intangible factors that are applicable only to a particular type of asset based on industry or other knowledge about the specific asset. Such factors include, such as for private equity funds, asset cost basis, deal backing, public market P/Es, global terror, fund vertical focus, top quintile GP, bottom quintile GP, news/media focus, staff turnover, founder sale or resignation and interest rates or US dollars. The user weights and ranks each of the selected precepts that will be applied to the selected or to all selected assets (if more than one), based on knowledge or information on the specific asset, to determine whether the selected Q-factor will have a positive, negative or neutral impact on the aggregate Q-factor value (see operation 153). In other words, for each asset, the weighting/ ranking of a given Q-factor may be different depending on how that particular Q-factor applies to each asset. For example, based on industry information, private equity fund X may have a history of investments in foreign countries that have recently suffered from terrorist incidents, while private equity fund Y invests only in industrialized countries that have no terrorist issues. For fund X, the Q-factor of global terror would have a negative contribution to the aggregate Q-factor variable, while for fund Y, that Q-factor may have a positive or at best a neutral contribution to the aggregate Q-factor value for fund Y.

Figure 3H:
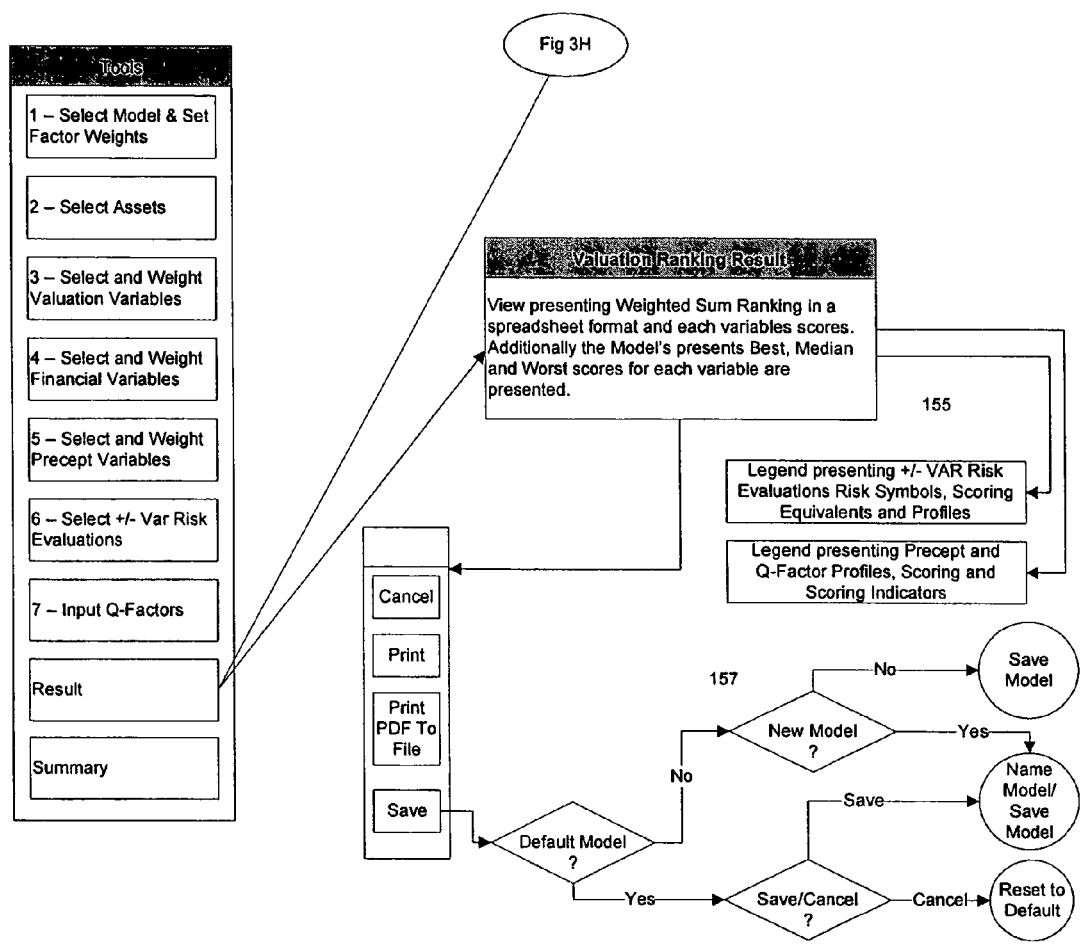
FIG. 3H shows a system block diagram or flow chart illustrating the functional operation of the valuation ranking result procedure in a global information network implementation of the present invention.

As shown in FIGS. 3 and 3H, after all the quantitative and qualitative factors are for each asset are defined and inputted, the user may then generate a report or display of the valuation ranking result (see operation 155). This valuation ranking result represents a model of the performance and/or comparative status of the selected asset(s). In the software implementation of the present invention, the user may save the model (see operations 123,157,161) in order to apply the model to other relevant assets, or to update the model as conditions or information change relating to the selected asset(s).

In addition to the main features of the present invention, the saving operations for the models that are created (see operations 123,157,161) may be used as a safeguard mechanism to prevent users from fraudulently manipulating data on assets being monitored and destroying any trail of the models they used to produce the fraudulent data. The saving operation of the software implementation may be designed to automatically save all models that are created independent of the user's desire or intent, and prevent any deletion of any models.

Figure 3J:
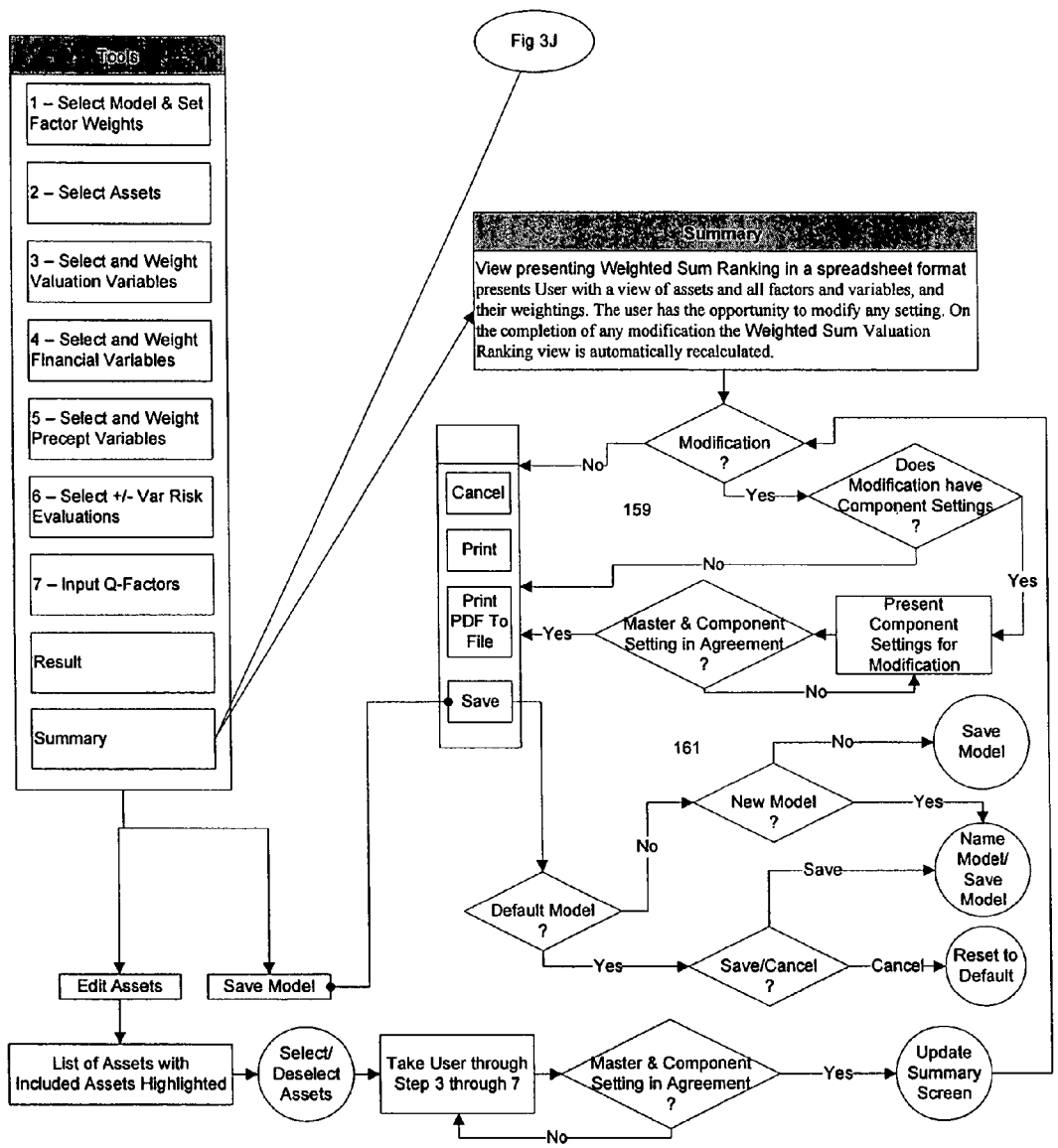
FIG. 3J shows a system block diagram or flow chart illustrating the functional operation of the model summary procedure in a global information network implementation of the present invention.

According to FIGS. 3 and 3J, the user may also generate a report or display of a summary of the model. The user may also modify any of the factors, variables and values currently in the model. However, the software implementation, any change would require other factors, variables and values that are related to those that are modified to be changed as well, either automatically or through user input (see operation 159).

Figure 4:
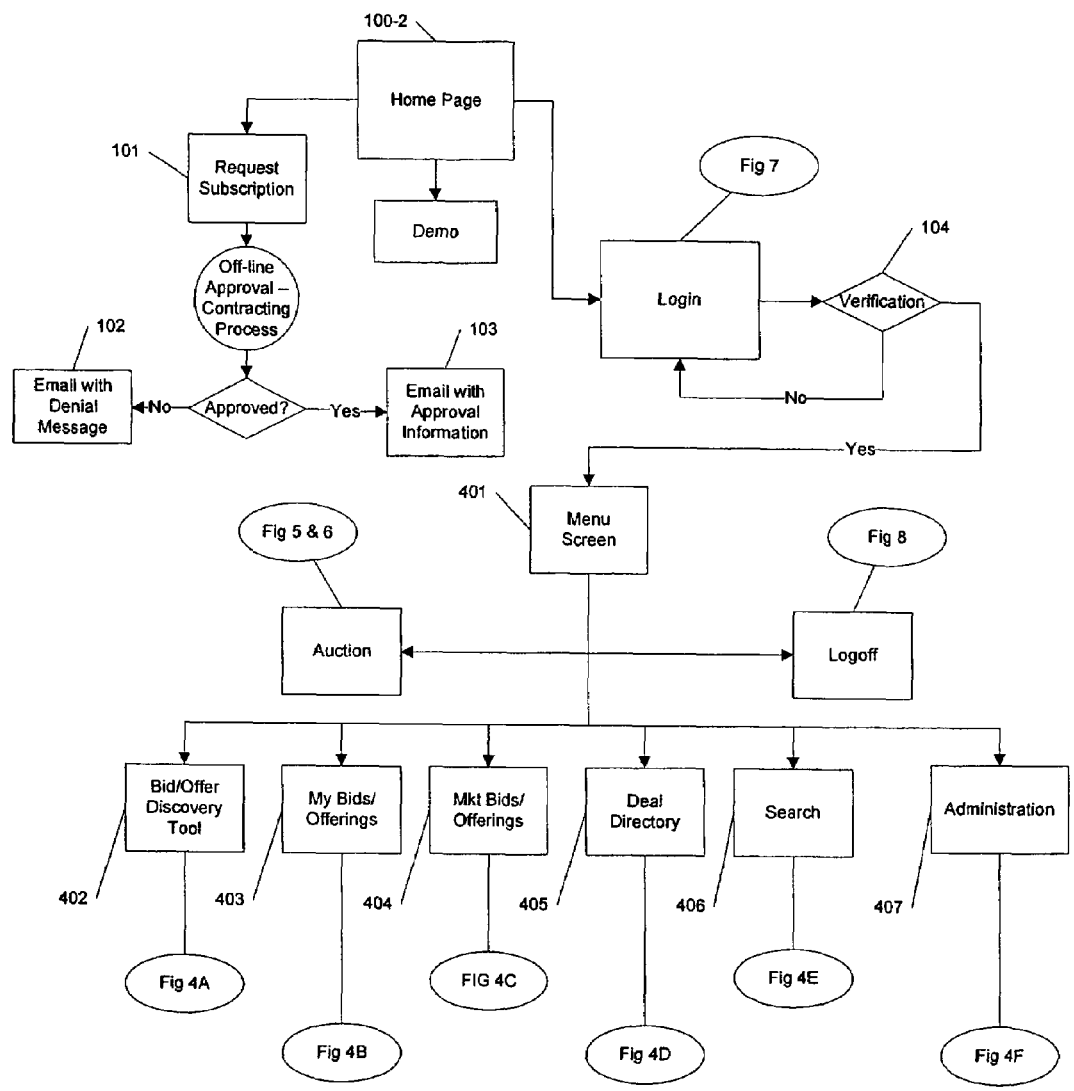
FIG. 4 shows a system block diagram or flow chart illustrating the functional operation of the home page of the asset access or trade module in a global information network implementation of the present invention.

FIG. 4 illustrates a software implementation of the asset access or trade module 1C of the present invention. This module allows the user to conduct transactions relating to a selected asset or assets. Such transactions include bids to buy, offers to sell, auctioning, like-kind exchanges, and any other transfers of assets.

Figure 4A:
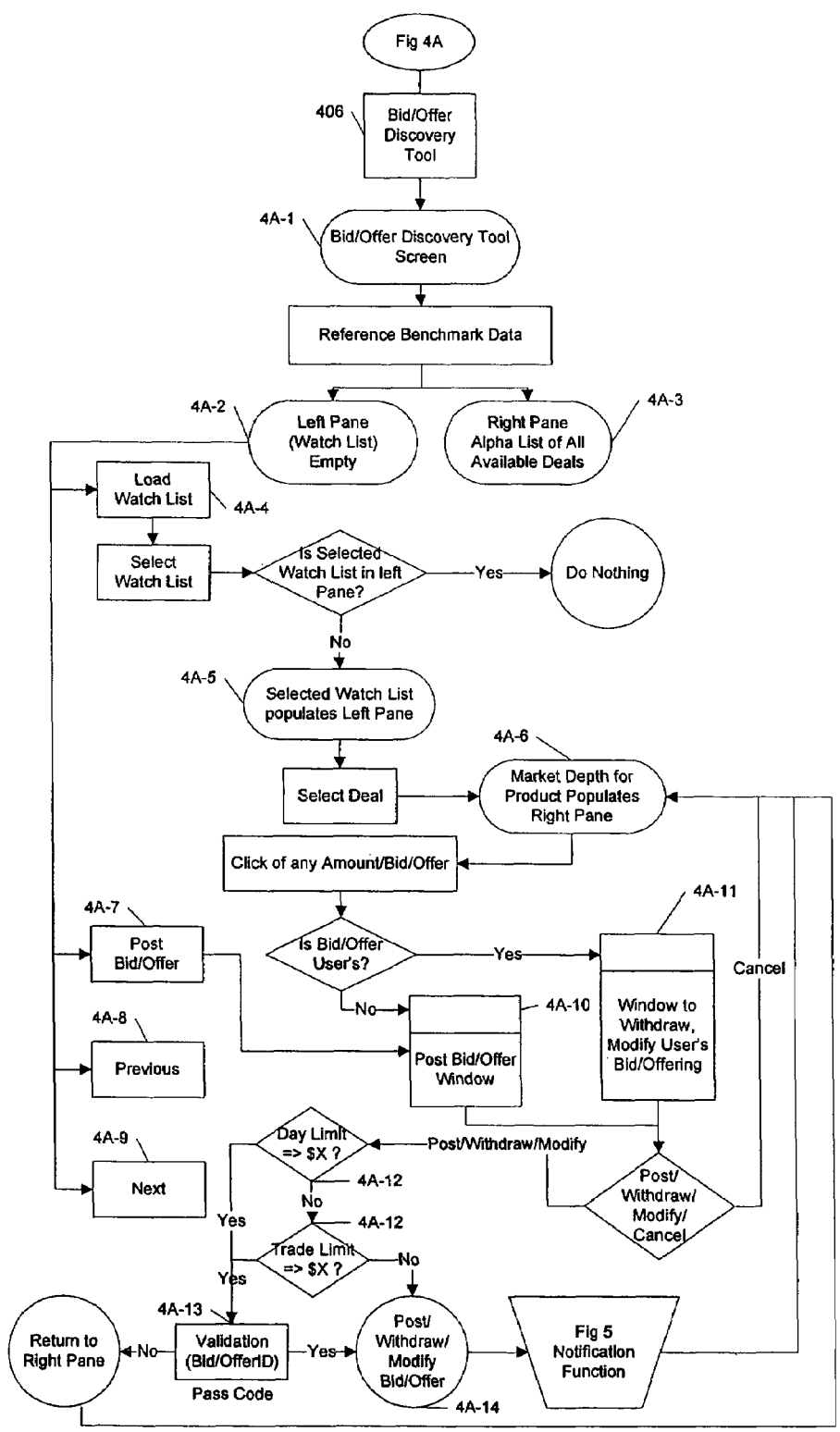
FIG. 4A shows a system block diagram or flow chart illustrating the functional operation of the bid/offer discovery procedure in a global information network implementation of the present invention.

In the software implementation as illustrated in FIG. 4, the operation of the asset access or trade module incorporates a series of sub-modules/operations or tools to accomplish the various types of transactions desired. Those tools include Bid/Offer Discovery, My Bids/Offerings, Market Bids/Offerings, Deal Directory, Search, Administration, and Auction. As shown in FIG. 4A, the Bid/Offer Discovery tool allows the user to maintain a watch list of assets in which the user is interested (see steps 4A-2, 4A-4, 4A-5), as well as a list of all deals currently listed in the data center 2D (see step 4A-3). Such deals include any and all assets that have outstanding offers for sale, bids for buying or other proposed transaction/ transfer associated with them. Listings for such deals will include market depth information derived from financial or other institutional information sources available, such as through the Internet or World Wide Web that is stored in the Data Center 2D. The user may use the watch list to monitor any deals for which he/she has an outstanding bid/offer or any deals that the user just wishes to monitor. As such, the user may populate the watch list as he/she posts bids and/or offers (see step 4A-7).

In addition to viewing various deals, as noted above, the user may also conduct transactions including the posting of new bids and/or offers (see steps 4A-7, 4A-10), or modify any of his/her own outstanding bids/offers already posted (se step 4A-11).

With users that work for financial institutions, such users are typically bound by company or even regulatory limits as to how much money an individual can transact on a daily basis or on a per trade basis. The software implementation of the present invention includes an operation by which the posting of a bid or offer includes checking whether the user has exceeded a daily transactional limit or a per trade transactional limit (see step 4A-12). In this implementation, if the user does not exceed the daily limit but does exceed the per trade limit, authorization or validation may be obtained from a supervisor or upper management to complete the offer or bid (see step 4A-13). If neither limit is exceeded or if authorization is obtained, the bid or offer is posted (see step 4A-14), and notification is made, as will be explained further hereinbelow.

Figure 4B:
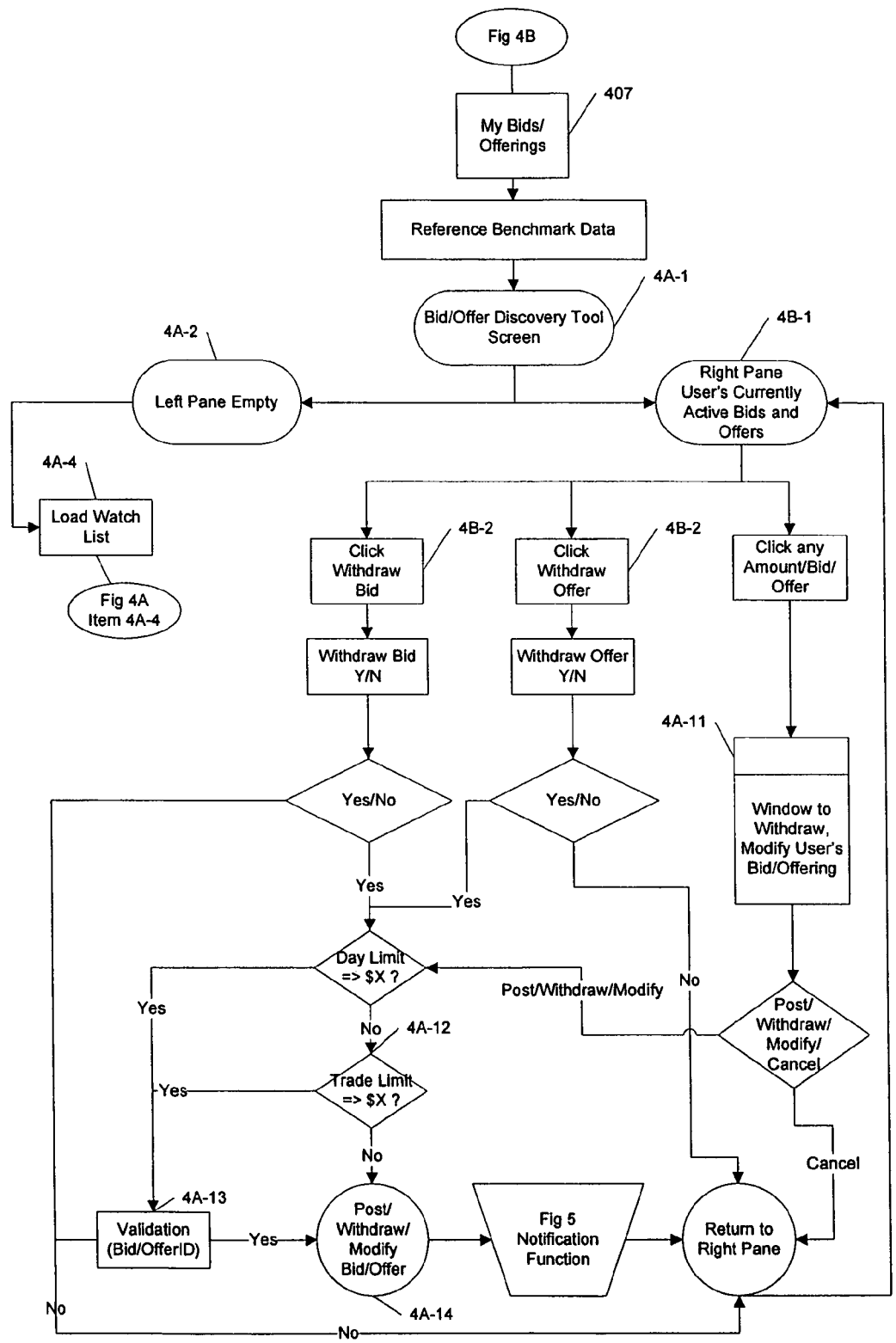
FIG. 4B shows a system block diagram or flow chart illustrating the functional operation of the user's bids/offers procedure in a global information network implementation of the present invention.

As shown in FIG. 4B, the My Bids/Offers tool allows the user to maintain the watch list of assets in which the user is interested (see steps 4A-2, 4A-4), as well as a list of all of the user's currently posted bids and offers (see step 4B-1) currently listed in the data center 2D. Listings for the user's outstanding bids and offers will also include market depth information derived from financial or other institutional information sources available, such as through the Internet or World Wide Web that is stored in the Data Center 2D. The user may conduct transactions with this tool relating specifically to modifying any of his/her own outstanding bids/offers already posted (see step 4A-11) or to withdrawing any of his/her own outstanding bids/offers (see step 4B-2). As with the Bids/Offers Discovery tool, the posting of any modification or withdrawal initiates the checking for whether the user has exceeded a daily transactional limit or a per trade transactional limit (see step 4A-12). In this implementation, if the user does not exceed the daily limit but does exceed the per trade limit, authorization or validation may be obtained from a supervisor or upper management to complete the offer or bid (see step 4A-13). If neither limit is exceeded or if authorization is obtained, the bid or offer is posted (see step 4A-14), and again notification is made, as will be explained further hereinbelow.

Figure 4C:
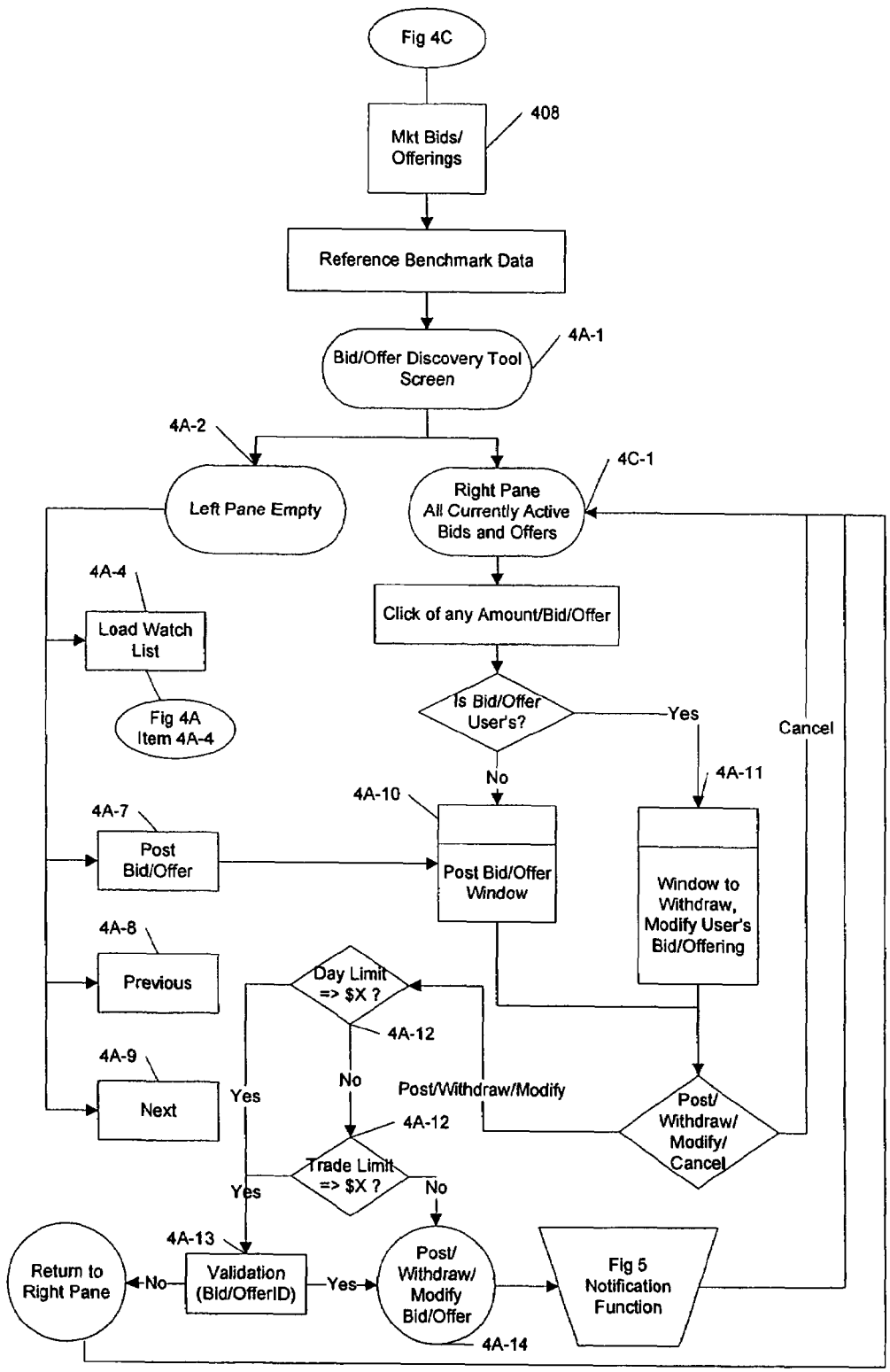
FIG. 4C shows a system block diagram or flow chart illustrating the functional operation of the market bids/offers procedure in a global information network implementation of the present invention.

With the Market Bids/Offers tool as shown in FIG. 4C, this tool allows the user to again maintain a watch list of assets in which the user is interested (see steps 2A-2, 2A-4), as well as a list of all deals from third parties currently listed in the data center 2D (see step 4C-1). Again, such deals include any and all assets that have outstanding offers for sale, bids for buying or other proposed transaction/transfer associated with them, and listings for such deals will include market depth information derived from financial or other institutional information sources available, such as through the Internet or World Wide Web that is stored in the Data Center 2D.

In addition to viewing various third party deals, the user may also conduct transactions but limited to the posting of new bids and/or offers (see steps 4A-7, 4A-10) in response to outstanding third party offers or bids, respectively, and to modifying or withdrawing any of his/her own outstanding bids/offers already posted (see steps 4A-10, 4A-11). Here also, the software implementation of the present invention includes an operation by which the posting of a bid or offer includes checking whether the user has exceeded a daily transactional limit or a per trade transactional limit (see step 4A-12). Again, if the user does not exceed the daily limit but does exceed the per trade limit, authorization or validation may be obtained from a supervisor or upper management to complete the offer or bid (see step 4A-13). If neither limit is exceeded or if authorization is obtained, the bid or offer is posted (see step 4A-14), and notification is made.

Figure 4D:
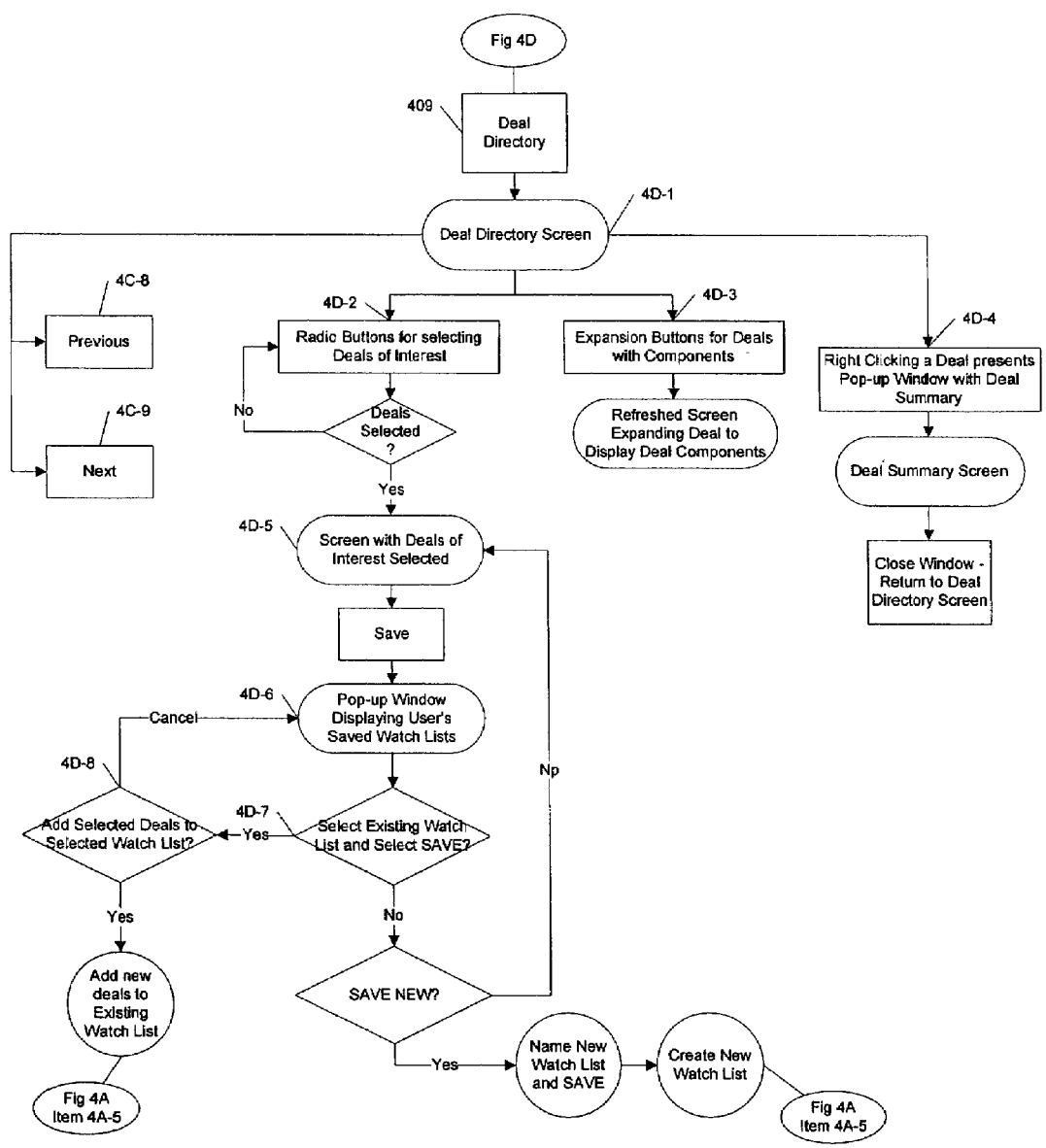
FIG. 4D shows a system block diagram or flow chart illustrating the functional operation of the deal directory procedure in a global information network implementation of the present invention.
Figure 4E:
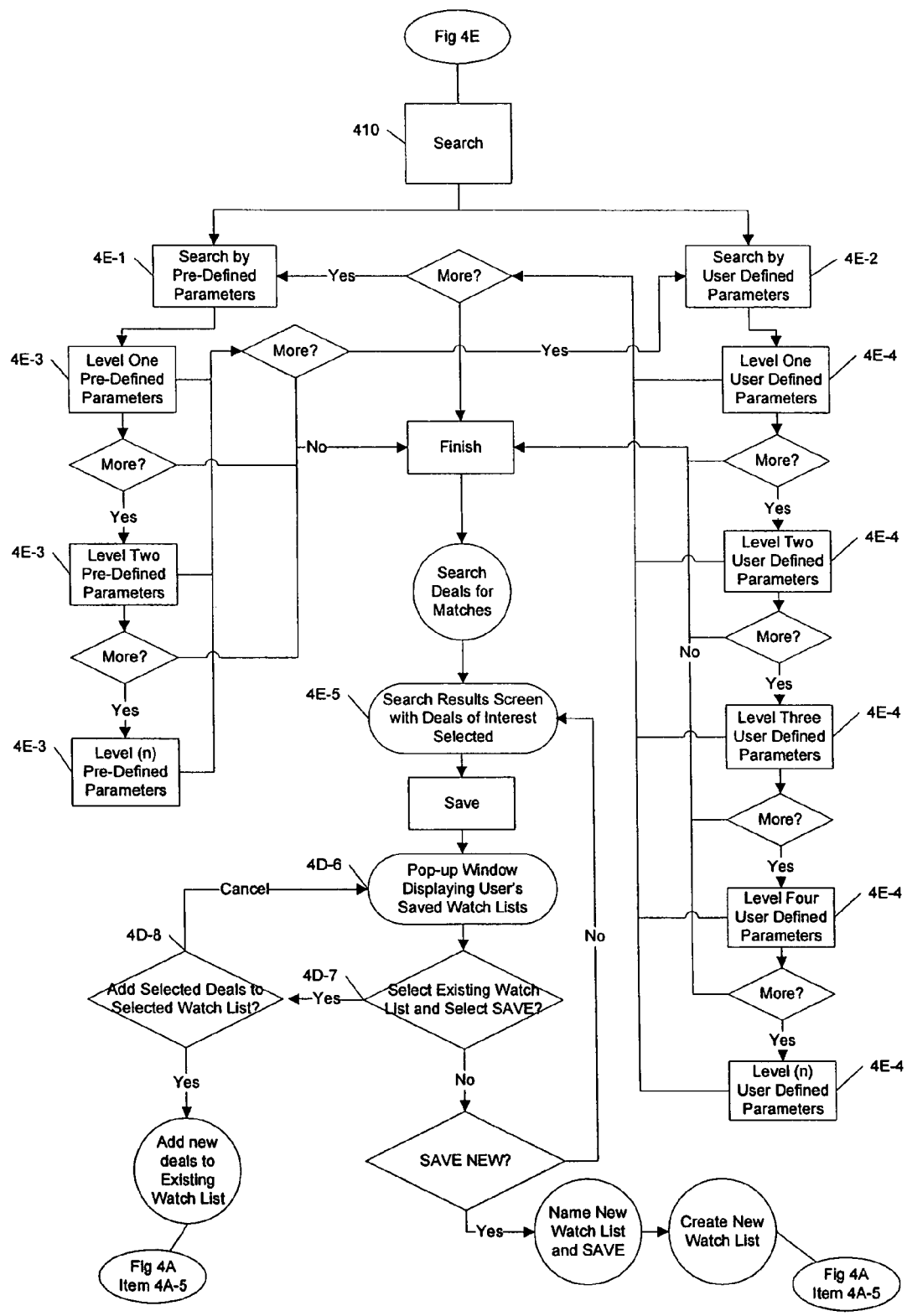
FIG. 4E shows a system block diagram or flow chart illustrating the functional operation of the search procedure in a global information network implementation of the present invention.
Figure 4F:
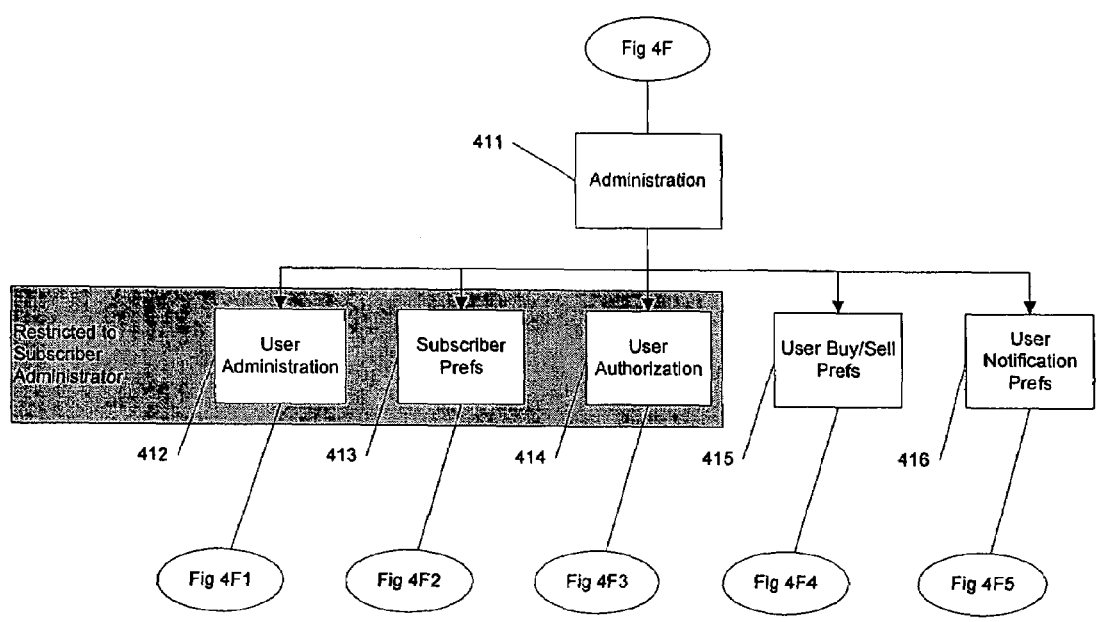
FIG. 4F shows a system block diagram or flow chart illustrating the functional operation of the administration procedure in a global information network implementation of the present invention.
Figure 5:
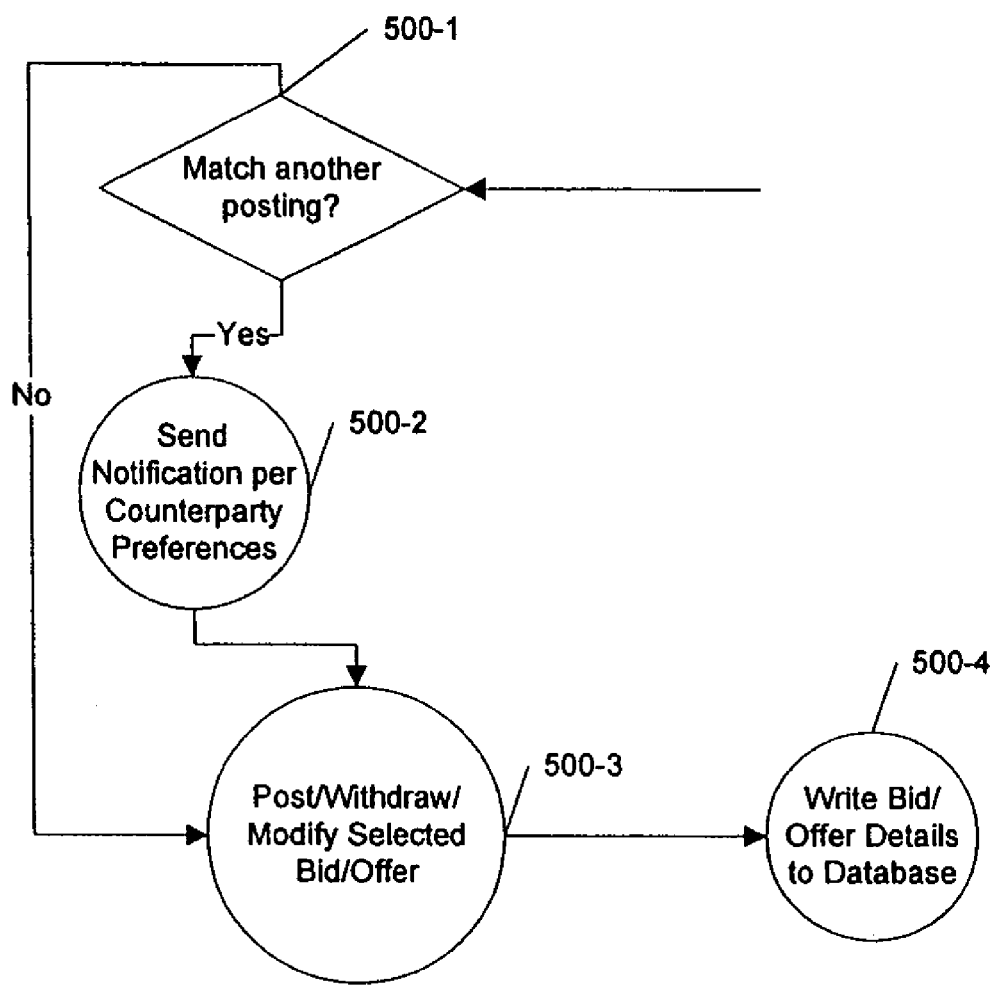

The software implementation of the present invention may further include numerous other tools or functions that may be useful to a user. Such tools include a Deal Directory as shown in FIG. 4D, Search as in FIG. 4E, and Administration as shown in FIGS. 4F and 4F1-4F5. Within the Administration tools, the functionalities that may be available to a user include User Administration as shown in FIG. 4F1, Entity Subscriber Preferences in FIG. 4F2, Entity Subscriber Authorization in FIG. 4F3, User Buy/Sell Preferences in FIG. 4F4 and User Notification Preferences in FIG. 4F5. As is apparent from each of the above-noted drawings, the functionalities represented by each of those tools are conventional and would be known and/or implementable by one of skill in the art. Such functionalities as well as any others illustrated in this application but which have not been specifically described are assumed to be implemented using conventionally known software techniques known in the art.

With respect to the User Notification Preferences as shown in FIG. 4F5, the system may be programmed to notify the user depending on the type of occurrence and/or the method of communicating the notification. For example, if the user is off-line and not currently logged in to the system, the user may have the system programmed to transmit a notification when only certain assets receive a bid or offer, or when a received bid or offer meets predefined minimum requirements, in accordance with the Notification Function, which will be discussed further hereinbelow. Also, this tool may be used to notify the user through an e-mail or text message to his/her cell phone, PDA or other portable communication device, or to notify the user at one or more predetermined locations via facsimile. For example, the system may be programmed to send a fax to the user's home office, the user's office or even to a hotel.

As shown in FIG. 5, the Notification Function as used in previously discussed modules or operations involves determining whether another posting matches the bid or offer that was just posted (see step 500-1). If yes, a notification is sent to the parties (see step 500-2) in accordance with their individual preferences as inputted via the User Notification Preferences tool (see FIG. 4F5). If no match occurs or after the notifications are sent, the system proceeds with the posting/withdrawal/modification of the bid or offer at issue (see step 500-3), and the bid or offer at issue is then written into the database in the Data Center 2D (see step 500-4).

Figure 6:
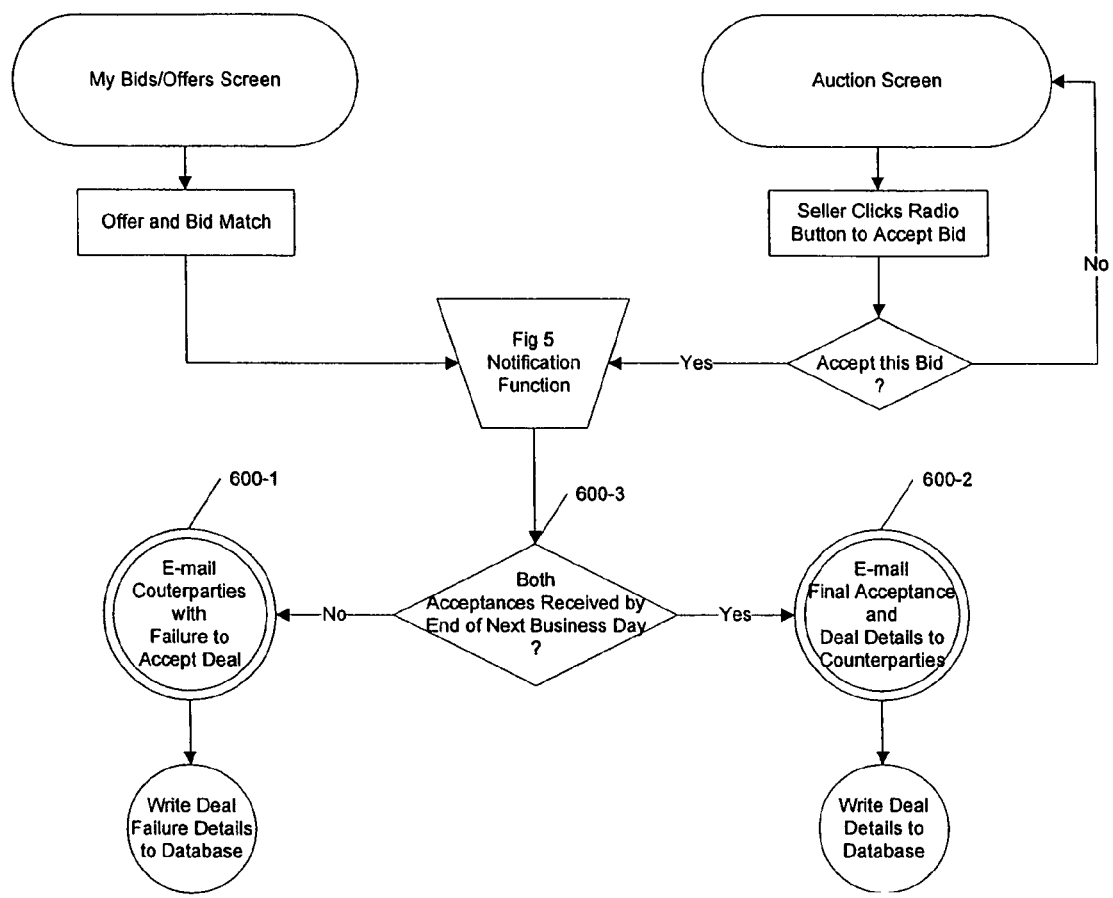
FIG. 6 shows a system block diagram or flow chart illustrating the functional operation of the acceptance function in a global information network implementation of the present invention.

According to FIG. 6, the software implementation of the present invention includes an Acceptance Function or operation that occurs after a match in a bid and offer occurs, as explained above, or as a result of an acceptance of an auction, as will be explained further hereinbelow. In the operation of the Acceptance Function, the system of the present invention determines whether an acceptance has been received or communicated by both parties by a predetermined time limit, such as the end of the next business day (see step 600-3). If yes, the final acceptance and deal details are communicated (for example, via e-mail) to both counterparties and the deal details are written to the database in the Data Center 2D (see step 600-2). Otherwise, a failure to accept notification is communicated (for example, via e-mail) to both counterparties and deal failure details are written to the database in the Data Center 1620 (see step 600-1).

Figure 7:
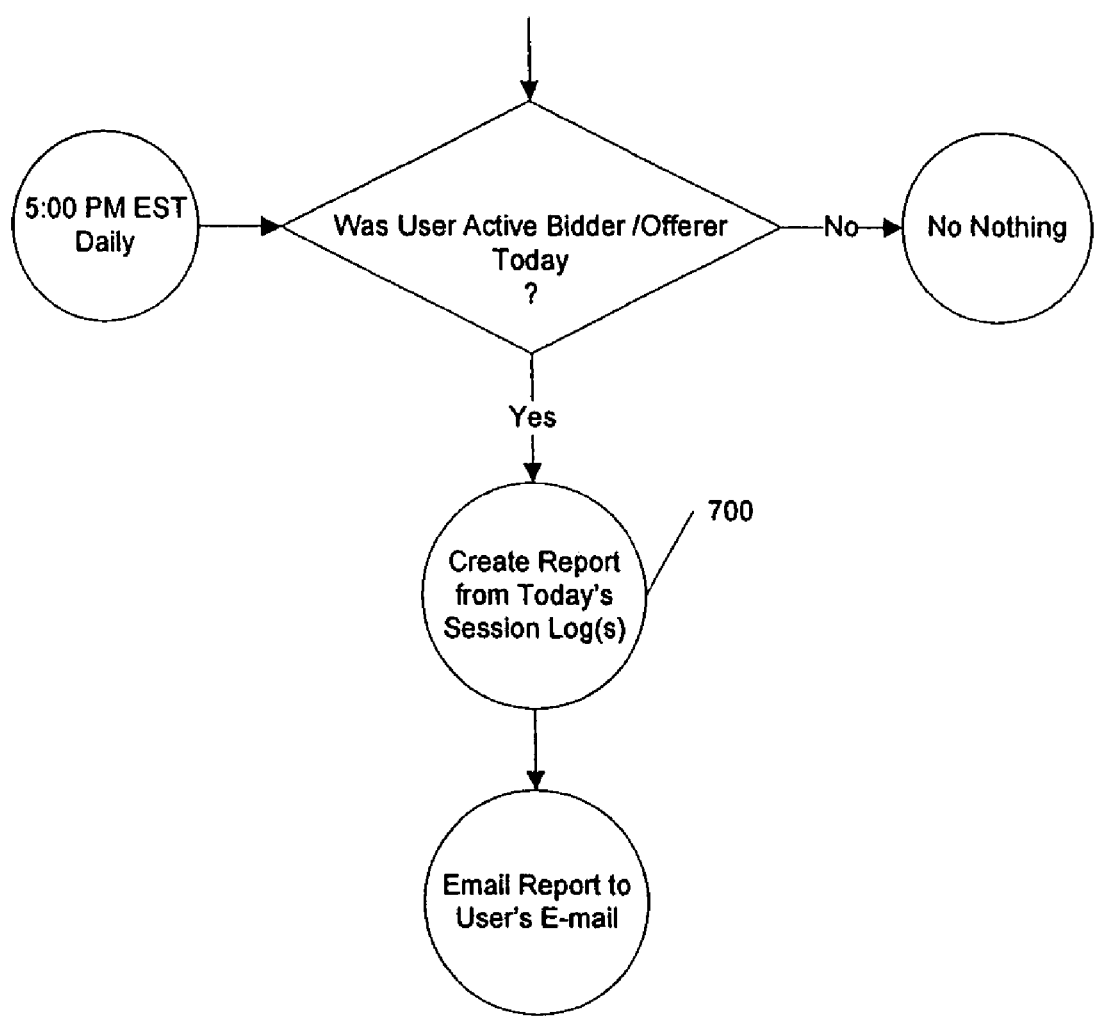
FIG. 7 shows a system block diagram or flow chart illustrating the functional operation of the end-of-day function in a global information network implementation of the present invention.
Figure 8:
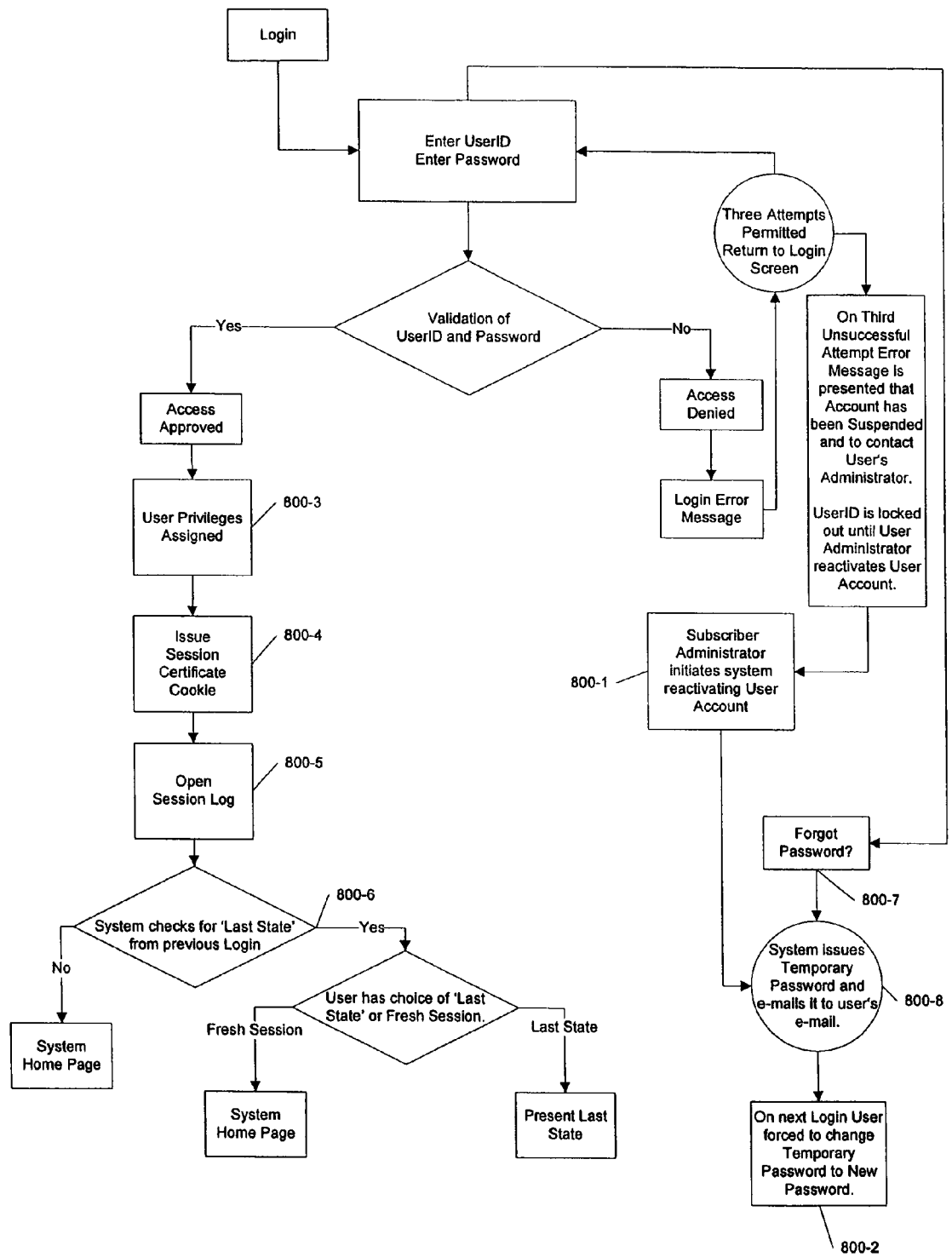
FIG. 8 shows a system block diagram or flow chart illustrating the functional operation of the login function in a global information network implementation of the present invention.
Figure 9:
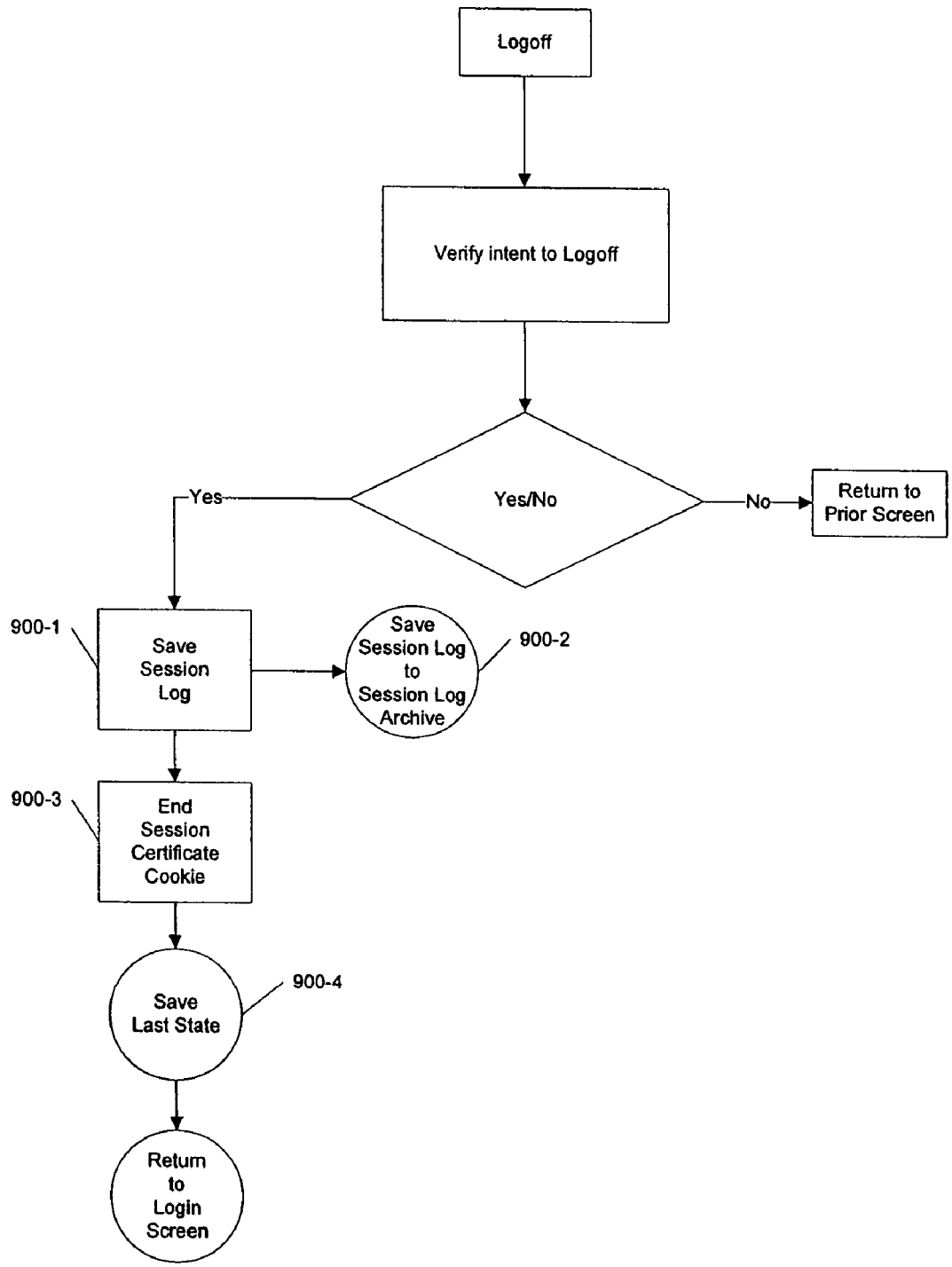
FIG. 9 shows a system block diagram or flow chart illustrating the functional operation of the logoff function in a global information network implementation of the present invention.

FIGS. 7-9 represent conventional functionalities necessary for the software implementation of the present invention, but which would be know to those of skill in the art for purposes of implementation, and are not being discussed in detail unless otherwise necessary. Those functionalities include an End-of-Day Function (FIG. 7), a Login Function (FIG. 8), and a Logoff Function (FIG. 9).

Figure 10:
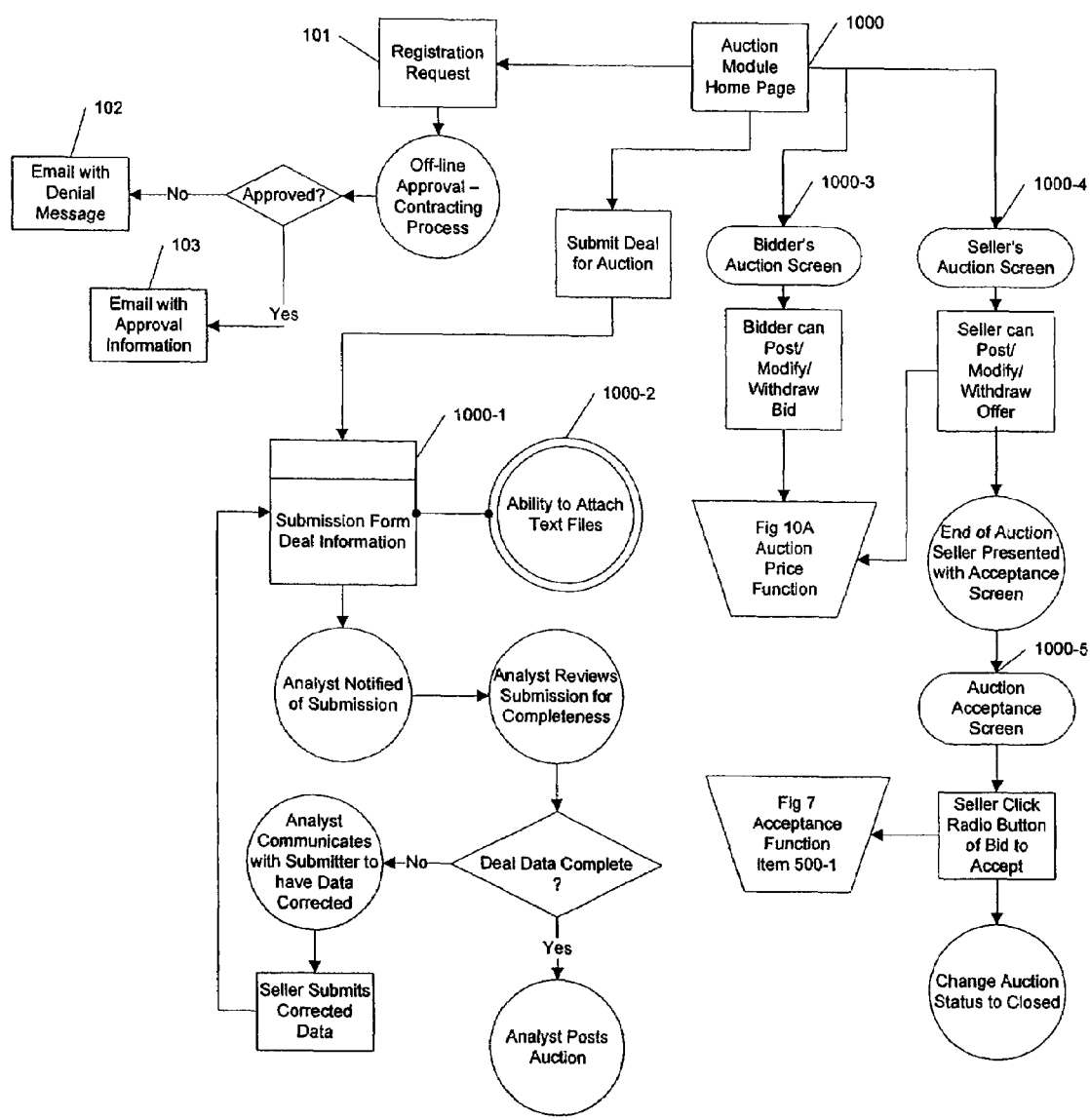
FIG. 10 shows a system block diagram or flow chart illustrating the functional operation of the auction module in a global information network implementation of the present invention.
Figure 10A:
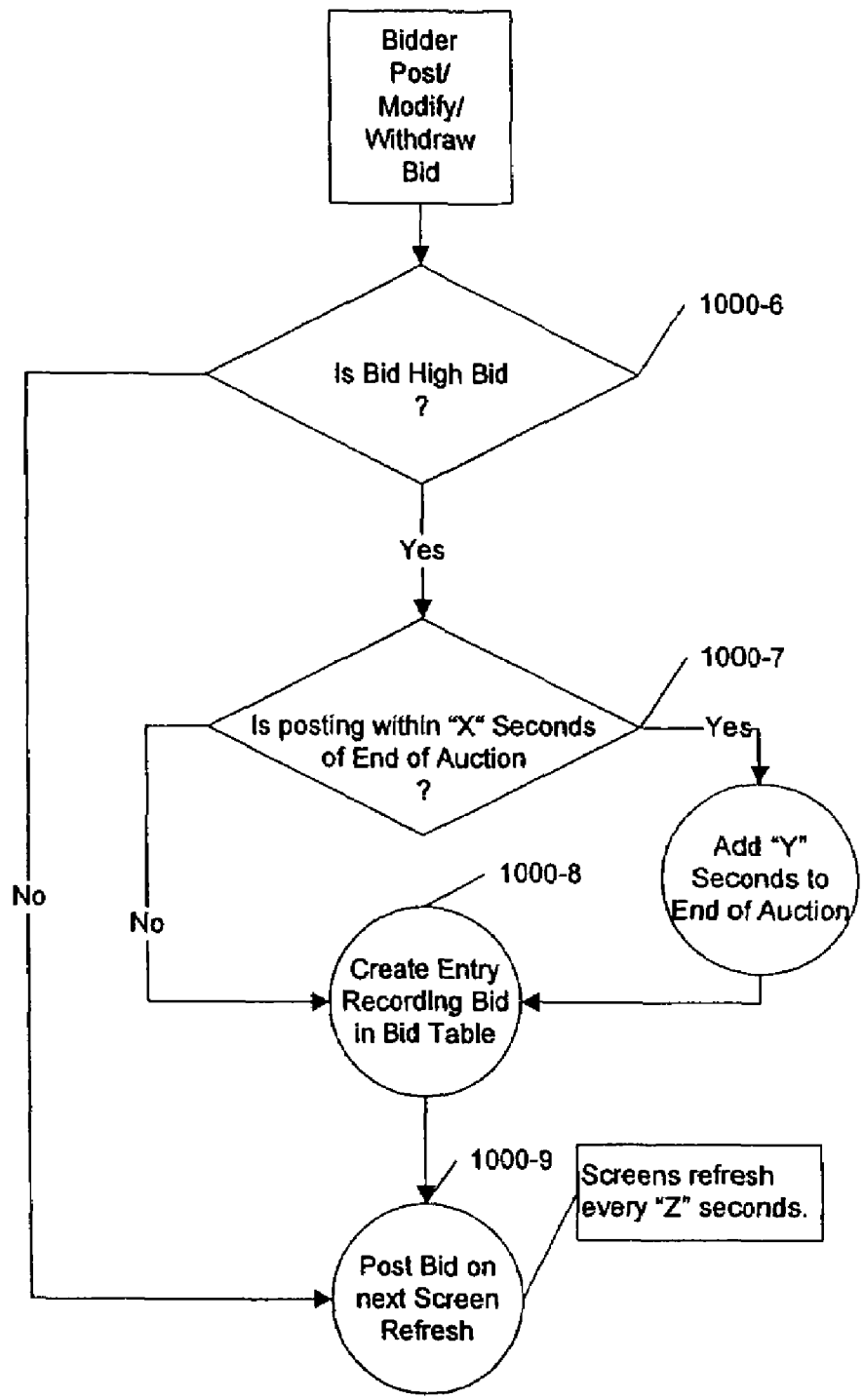
FIG. 10A shows a system block diagram or flow chart illustrating the functional operation of the auction price function or procedure in a global information network implementation of the present invention.

FIG. 10 illustrates an Auction Function that incorporated various features, among which are Deal Information Submission Form (see operation 1000-1), a Bidder's Auction Screen (see operation 1000-3, a Seller's Auction Screen (see operation 1000-4), and an Auction Acceptance Screen (see operation 1000-5). Within the operation of deal information being submitted (see operation 1000-1), an analyst is notified of the submission who then reviews the submission for completeness. If the submission is deficient, the analyst communicates with the submitter to correct and submit the data. Once the analyst determines that the deal information is complete, the analyst posts the auction. Via the operation 1000-3, a bidder may post, modify or withdraw a bid, while in operation 1000-4, the seller may post, modify or withdraw an offer. If an acceptance occurs, the Acceptance Function comes into operation in accordance with FIG. 7. Another feature of the Auction Function in accordance with the present invention, as shown in FIG. 10A, the Auction Price function determines whether a bidder just posted, modified or withdrew a bid that results in the bid being the high bid in the auction (see step 1000-6). If yes, the system determines whether the posting was done within a predetermined time period before the end of the auction. If yes, the system extends the time of the auction. If no or after extending the time, the system then creates a data entry into a bid table recording that bid (see step 1000-8). Afterwards or if the bid at issue was not the high bid, the bid is posted (see step 1000-9).

Figure 11:
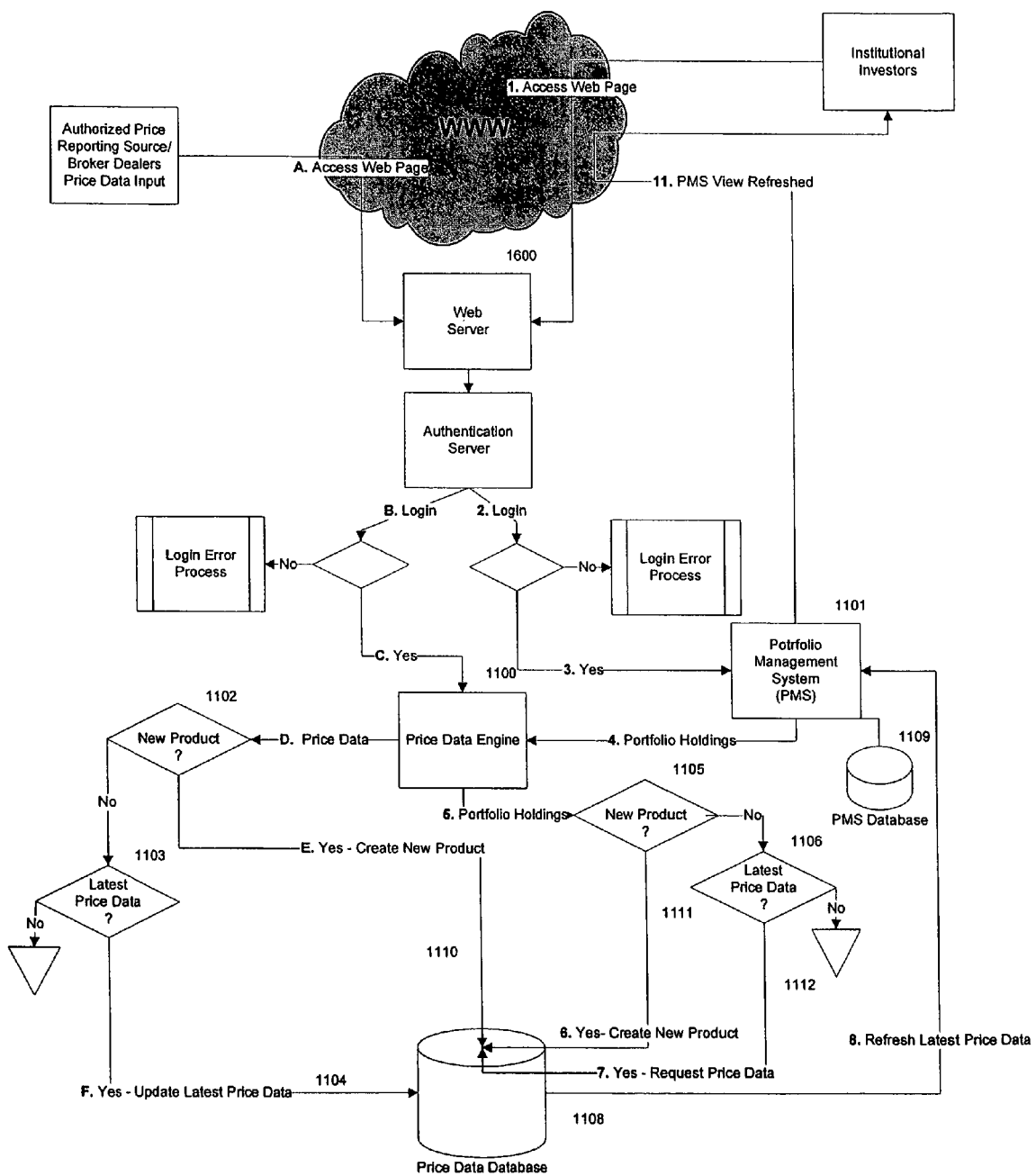
FIG. 11 shows a system block diagram or flow chart illustrating the functional operation of the asset track module in a global information network implementation of the present invention.
Figure 11A:
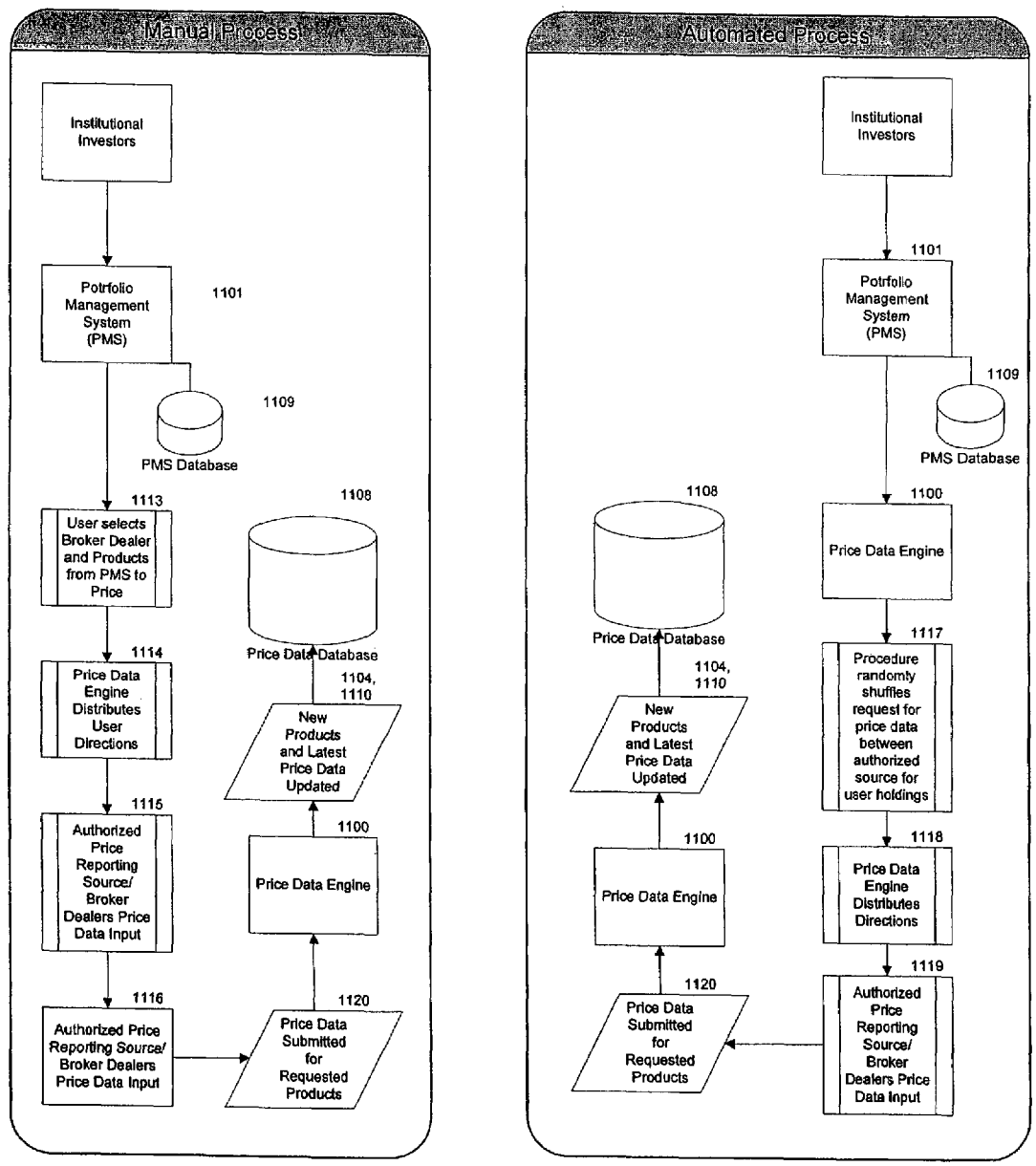
FIG. 11A shows a system block diagram or flow chart illustrating the functional operation of the data reporting and updating functions or procedures in the asset track module in a global information network implementation of the present invention.

FIGS. 11 and 11A illustrate the asset track module 1B and its general operation. As shown, users such as institutional investors, and authorized price reporting sources or broker dealers, access the system of the present invention via a global information network, such as the Internet or the World Wide Web, through the server 1600. As part of the process of accessing the system of the present invention, the users would also go through an authentication server, such as those already conventionally known to those of skill in the art.

Once the user passes through the authentication server, users that are institutional investors are directed to the Portfolio Management Engine (PME) system 1101 of the present invention, while authorized price reporting sources or broker dealers are directed to the price data engine so that they may input price data into the price data database 1108, such as at the Data Center 2D.

Within the PME operation of the present invention, users may access the various modules 1A-1C, as well as all the other functionalities described above in the implementation of the present invention. Data relating to the PME system operations of the present invention may be stored in the PME database 1109 or at the user's site. This will depend on the user's requirements or on the requirements of the entity controlling the server 1600, or even other requirements such as to meet statutory or regulatory limitations.

In the operation of inputting price data, price reporting sources and broker dealers will enter price data via the price data engine 1100 which will determine whether the price data being entered relates to a new product (see step 1102). If yes, the price data engine 1100 creates a new record on the new product or asset in the database 1108 (see step 1110). If the price data is not for a new product, the price data engine will then determine whether the inputted data is the latest price data (see step 1103). If yes, the price data on the asset to which the inputted data is related is updated in the database 1108 (see step 1104). Otherwise, the price data engine ignores the inputted data. In one embodiment, the updating of the database 1108 is accomplished by creating a new record on the same asset(s) that is time and/or date stamped in order to create a price history record for the asset (s) in the database 1108.

Similarly, in the operation of inputting portfolio holdings data, the price data engine 1100 will determine whether the portfolio holdings data being entered relates to a new product (see step 1105). If yes, the price data engine 1100 creates a new record on the new product or asset in the database 1108 (see step 1111). If the portfolio holdings data is not for a new product, the price data engine will then determine whether the inputted data is the latest price data (see step 1106). If yes, the price data engine 1100 will request the price data for the new product or asset to which the inputted data is related so that the price data may be added to the database 1108 (see step 1112). Otherwise, if the data does not have the latest price data, here also the price data engine 1100 ignores the inputted data. The updating or recording of price data in the database 1108 is accomplished, in one embodiment, also by creating a new record on the same asset(s) that is time and/or date stamped in order to create a price history record for the asset(s) in the database 1108.

FIG. 11A illustrates the processes by which price data and new product data are entered into the price data database 1108, either manually or automatically. In the manual process, the institutional investors or users access the price data engine 1100 via the PME system 1101 and request price data for one or more assets, such as those assets or holdings the user owns. First, the user must select the broker dealer or authorized source to use and identify the asset(s) to be priced via the PME 901 (see step 1113). The price data engine 1100 then distributes the request(s) with user defined directions to the authorized source or sources, if more than one (see step 1114). The authorized sources will generate the requested price data (see step 1115), and the price data is inputted into the system (see step 1116). The price data engine 1100 will then receive the price data inputted from the authorized source(s) (see step 1120). Afterwards, the price data is entered into the database 1108 (see steps 1104,1110). Consistent with the operations discussed above, price data on an asset is recorded with time and/or date stamping in order to create a price history record for the asset(s).

In the automated process, institutional investors or users again access the price data engine 1100 via the PME system 1101 and request price data for one or more assets. The price data engine 1100 then determines which authorized source or sources will be used to analyze and generate the price data. If price data on more than one asset is requested, the price data engine 1100 randomly shuffles the requests for each asset and distributes the requests among the authorized sources (see step 1117). This mechanism is used to guard against any one authorized price source from determining the source or owner of the asset which could potentially result in the source attempting to manipulate the price data to their advantage. The price data engine 1100 then distributes the requests with directions to the various authorized sources (see step 1118). The authorized sources will generate the requested price data (see step 1119), and the price data engine 1100 will then receive price data back from the authorized sources (see step 1120). Afterwards, the price data is entered into the database 1108 (see steps 1104,1110). Again consistent with the operations discussed above, price data on an asset is recorded with time and/or date stamping in order to create a price history record for the asset(s).

With either the manual system or the automated system, the price source can input prices into the system either manually (through an input screen) or electronically (automatically-machine to machine).

Figure 12:
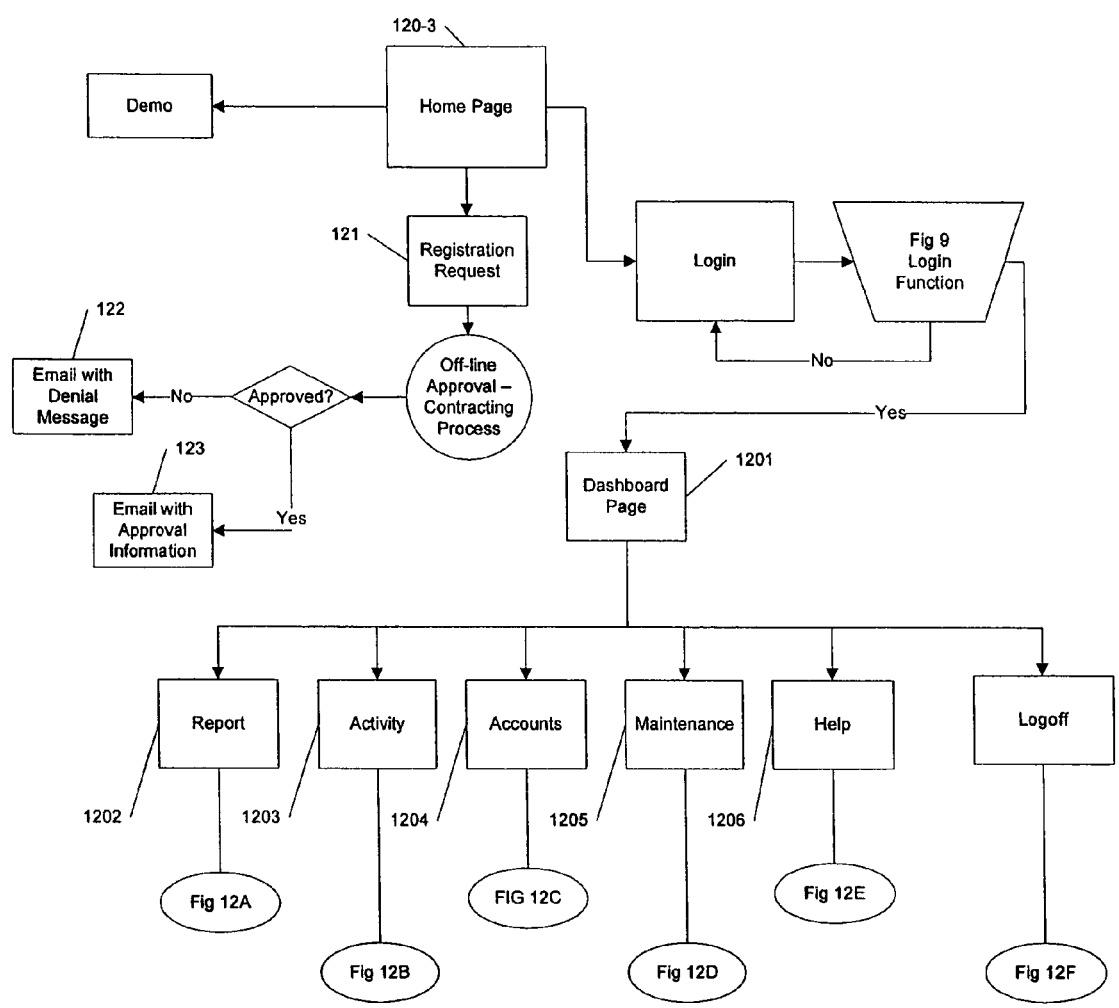
FIG. 12 shows a system block diagram or flow chart illustrating the functional operation of the home page of the portfolio management engine (PME) module in a global information network implementation of the present invention.

FIGS. 12 and 12A-12F illustrate the software implementation of the operation of the PME system 1101. FIG. 12 illustrates the home page of the PME module which would be the interface through which the user would access the various functional modules of the present invention. The PME module or system 1101 incorporates functionalities such as Report as in FIG. 12A, Activity as in FIG. 12B, Accounts as in FIG. 12C, Maintenance as in FIG. 12D, Help as in FIG. 12E and Logoff as in FIG. 12F. Other functionalities represented in FIG. 12 embody software operations that are otherwise conventionally known and implementable by those of skill in the art.

Figure 12A:
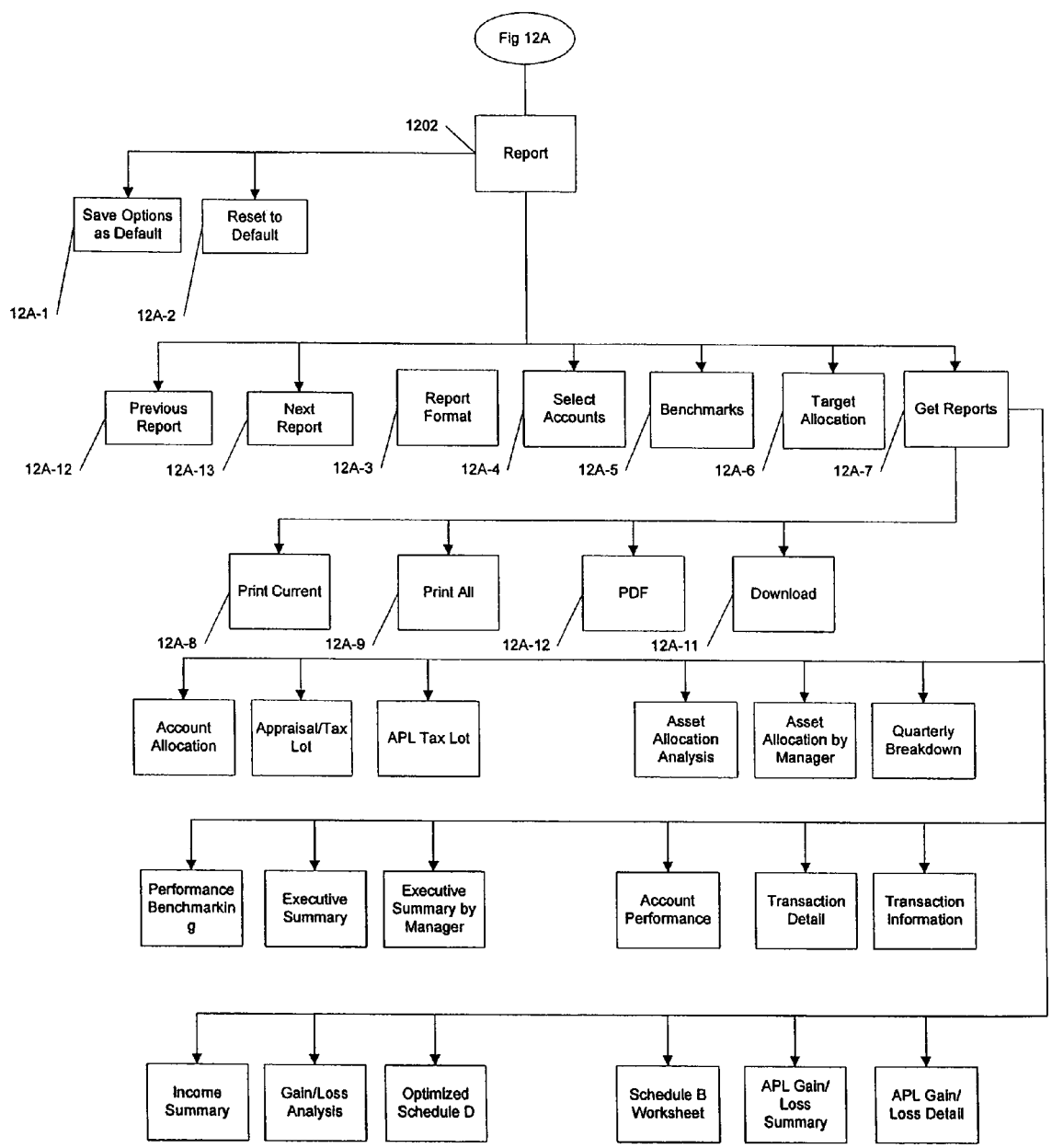
FIG. 12A shows a system block diagram or flow chart illustrating the functional operation of the PME report functions procedure in a global information network implementation of the present invention.

FIG. 12A represents the functionality of generating and outputting, such as by hardcopy print or display on a monitor, various reports that would be useful and desirable in the monitoring and transacting of various assets, and of being able to select and page through the various types of reports. Otherwise, the operation of the report functionality is otherwise conventionally known and implementable by those of skill in the art.

Figure 12B:
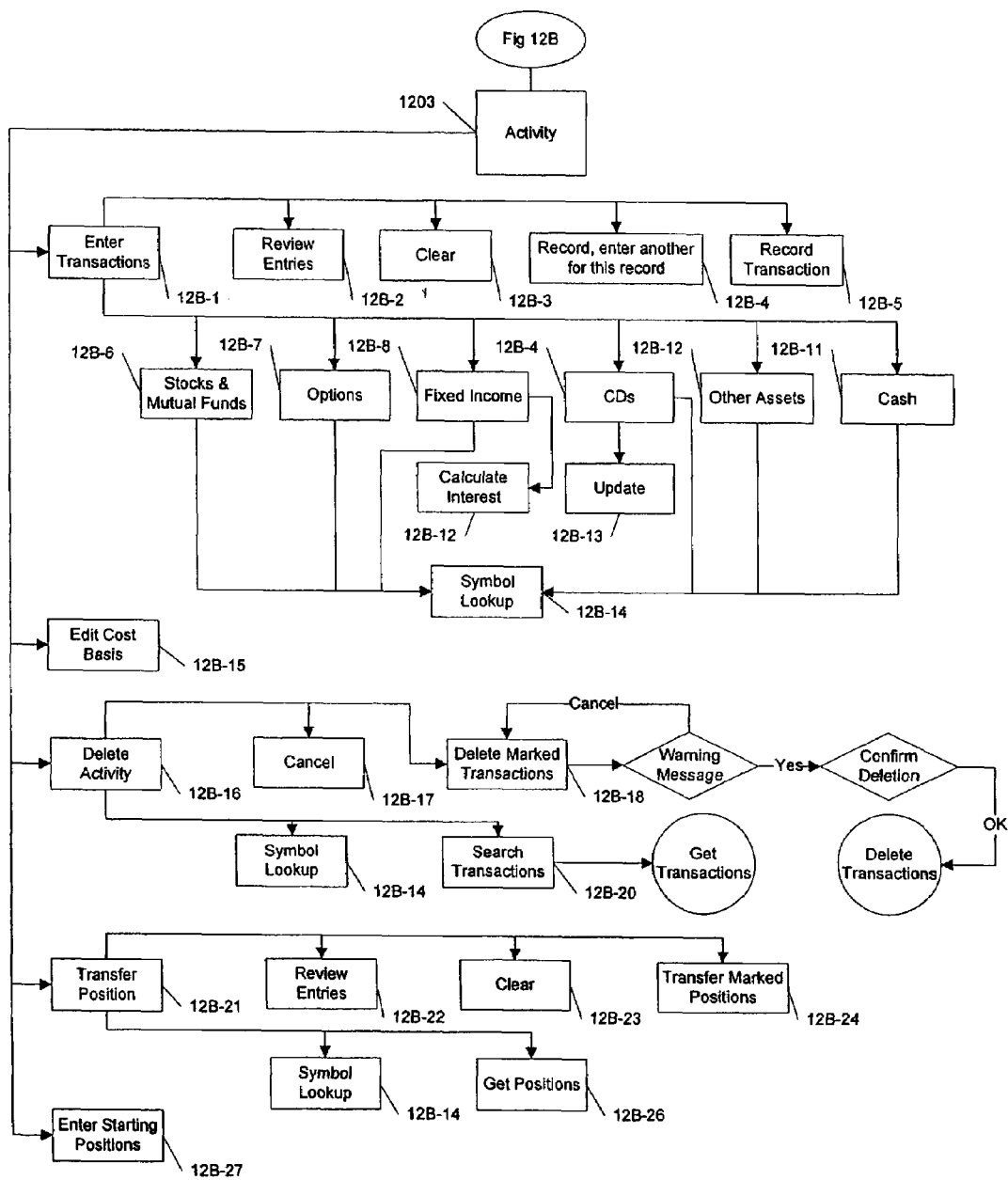
FIG. 12B shows a system block diagram or flow chart illustrating the functional operation of the PME activity functions procedure in a global information network implementation of the present invention.

FIG. 12B represents the functionality of conducting various user activities, including but not limited to those functionalities described above in connection with the software implementation of the various features of the present invention. Otherwise, the operation of the PME activity functionality is otherwise conventionally known and implementable by those of skill in the art.

Figure 12C:
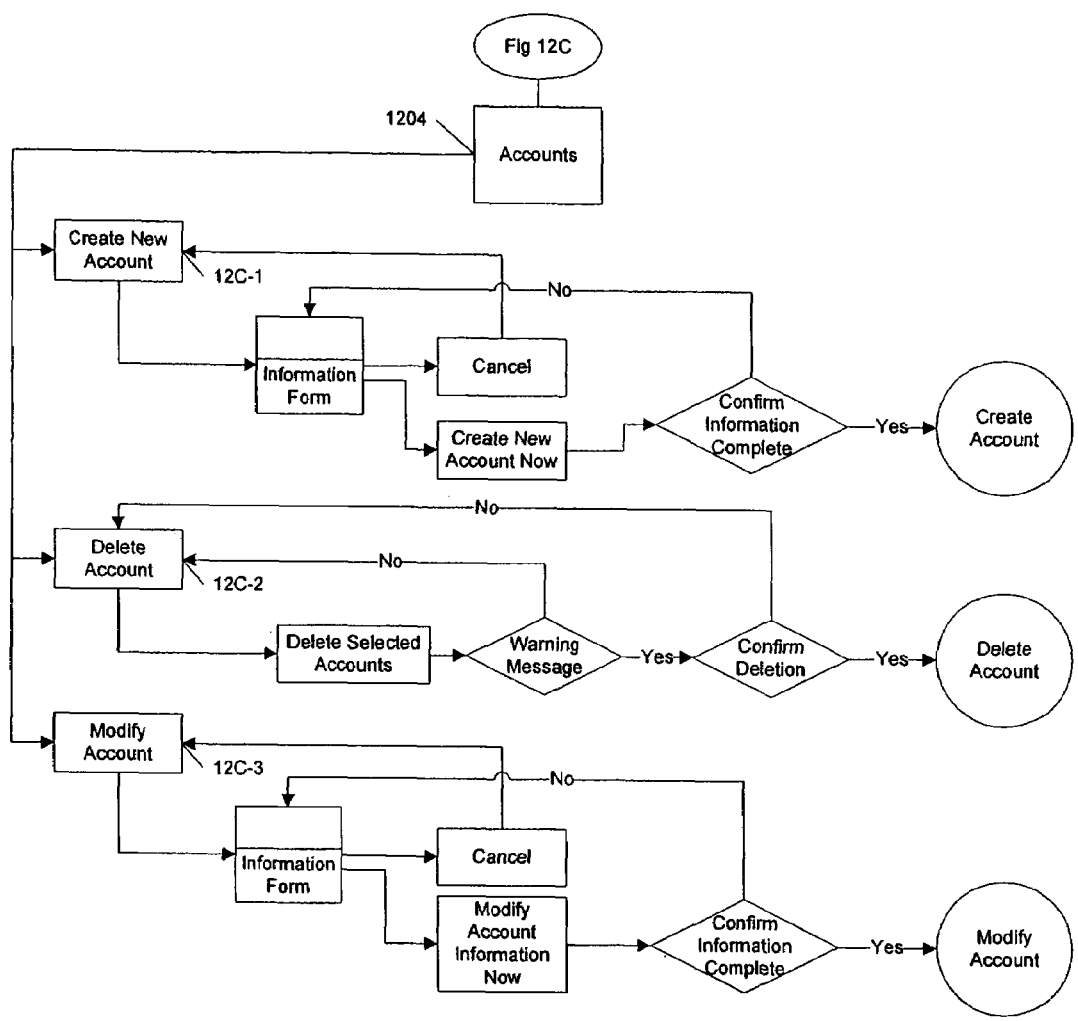
FIG. 12C shows a system block diagram or flow chart illustrating the functional operation of the PME account functions procedure in a global information network implementation of the present invention.
Figure 12D:
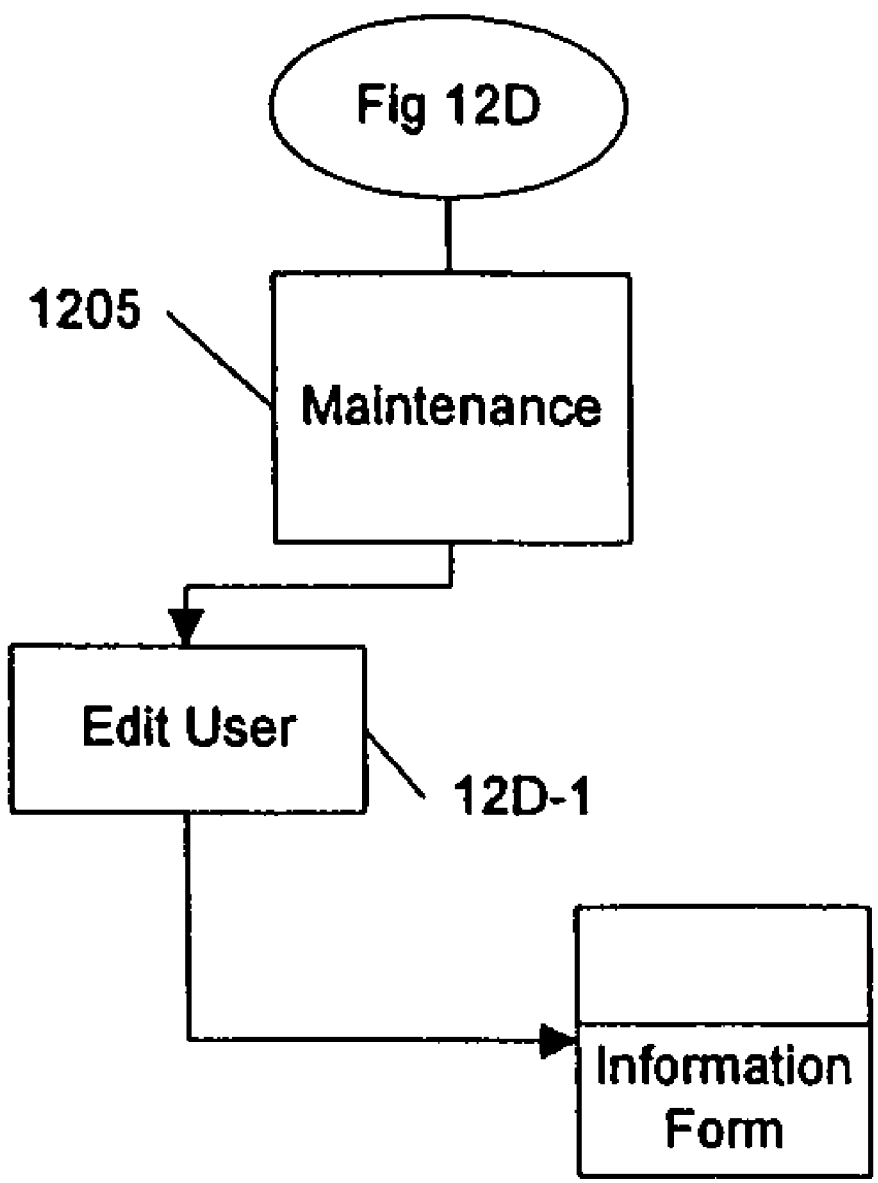
FIG. 12D shows a system block diagram or flow chart illustrating the functional operation of the PME maintenance functions procedure in a global information network implementation of the present invention.
Figure 12E:
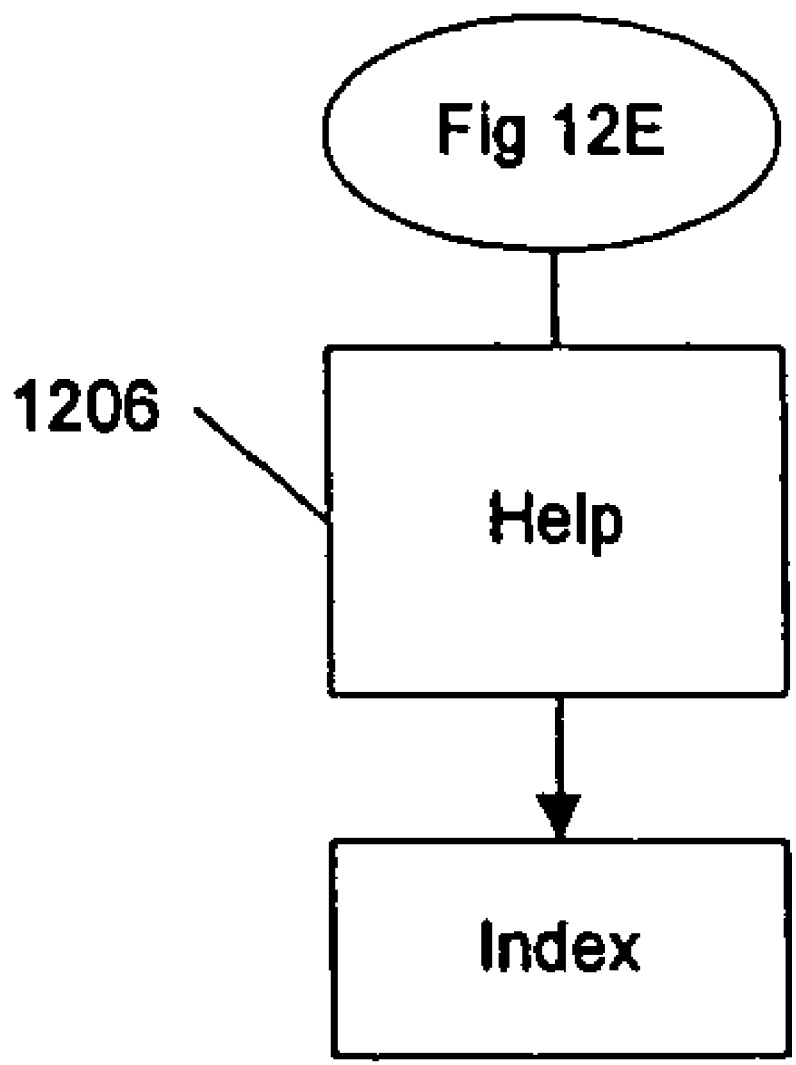
FIG. 12E shows a system block diagram or flow chart illustrating the functional operation of the PME help functions procedure in a global information network implementation of the present invention.
Figure 12F:
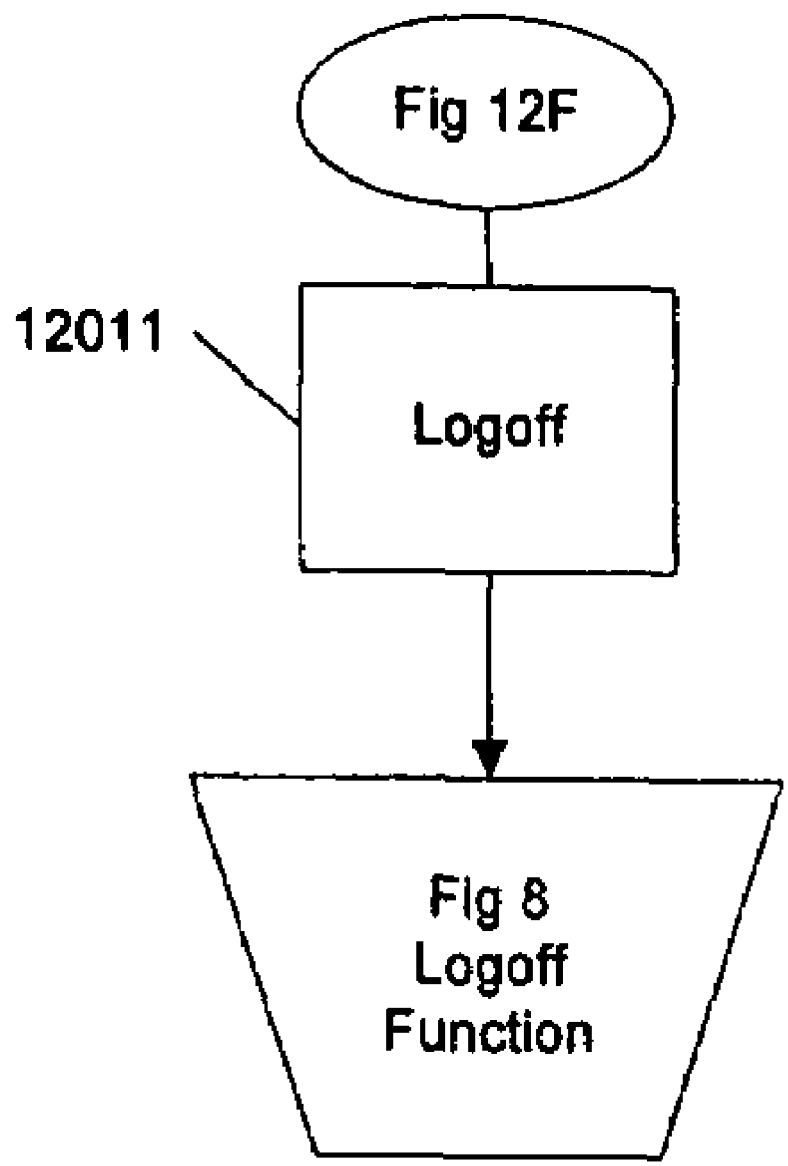
FIG. 12F shows a system block diagram or flow chart illustrating the functional operation of the PME logoff functions procedure in a global information network implementation of the present invention.

FIG. 12C illustrate PME functions represent conventional functionalities necessary for the software implementation of the present invention, but which would be know to those of skill in the art for purposes of implementation, and are not being discussed in detail unless otherwise necessary.

Hereinbelow is a callout listing of items referenced in all the drawings, including items not otherwise explained above:

- 100 Point of entry to system home page.
- 100-1 Point of entry to Analytic Module home page providing secure, password based login and authentication process allowing access to authorized modules; and a registration process for the service.
- 301 Registration form to apply for access to service. Form submitted for off-line approval and contracting process.
- 302 Upon denial of approval an e-mail message with reason for denial sent to applicant.
- 303 Upon successful completion of approval and contracting process e-mail sent to applicant with approval and temporary UserID and Password.
- 304 On submission of a UserID and Password the information is verified. If verified, user is presented with Menu screen. If not verified user is returned to Login screen.
- 305 In all function of the Analytic Module the system forces relationship agreement between Master Variables and Component Variables before the user can proceed to other functions.
- 3A-1 Tools include: Tables for selecting model and setting weightings of Model Factors, Table for selecting assets to be included in model, plus tables for selecting and setting weightings of: Valuation Variables, Financial Variables, "+/− VAR" Risk Evaluations, and Q-Factors.
- 3A-2 List of default and user's saved models.
- 3A-3 Reset Form resets current form's values to Model's default settings.
- 3B-1 User can select one or many assets to include in the model.
- 3B-2 Present a list of asset short names and descriptions.
- 3C-1 Number of variables to be selected is dependant on Model selected.
- 3C-2 User can modify any percentage by clicking on it, which presents a fill-in box. If the percentage being modified is a component of a master variable the system color codes the Master Variable Red or Green indicating whether the sum of the component variables equal the Master Variable's percentage. The system also restricts (by presenting an error message) the user from continuing to other functions until the relationship is in agreement.
- 100-2 Point of entry to the Trading Module home page providing secure, password based login and authentication process allowing access to authorized modules; and a registration process for the service.
- 401 Menu screen displays the functions allowing direct access to the desired function.
- 402 The Bid/Offer Discovery Tool provides functions to discover deal(s) of interest and place bids and offerings on those deals.
- 403 My Bids/Offerings provides functions for the user's active bids and offerings.
- 404 Mkt (Market) Bids/Offerings provides functions for all market bids/offers currently active.
- 405 Deal Directory provides functions for all deals in the product category.
- 406 Search function provides multiple parameters and input fields to target deals of interest.
- 407 Administration function allows the Subscriber Administrator to establish Subscriber Preferences and create a framework for system security and provides user utilities.
- 4A-1 The Bid/Offer Discovery Tool initial display is of all market bids/offers currently active in the right pane with the left pane empty.

The Bid/Offer Discovery Tool provides several options beginning with "Load a Watch List" and "Place a Bid/Offer."

- 4A-2 The left pane provides the function to load, and view a Watch List via Next and Previous buttons.
- 4A-3 The right pane initially provides an alphabetical list of all currently active market bids/offers or with a Watch List loaded and a deal selected the current "Market Depth" for the selected deal.
- 4A-4 Load Watch List function allows the user to load a previously saved Watch List. The function returns a pop-up window with user's saved Watch Lists for the user to select and load one.
- 4A-5 When loaded the Watch List populates the left pane. The user can now click a deal name (or component of a deal) and the right pane is re-populated with the current "Market Depth" for that deal. Right clicking a deal name presents a new window containing Deal Summary Information.
- 4A-6 When the user selects a deal in the Watch List, the currently active market bids/offers for the selected deal populate the right pane. These bids/offers are color coded to show three relationships: 1) User's Active Issues, 2) bids/offers by another party in your organization, and 3) bids/offers from counterparty that does not comply with user's Inclusion or Exclusion List. Additional, for bids/offers by another party in user's organization the user can mouse-over the bid or offer and a pop-up window appears with that party's name, location and phone number.
- 4A-7 Post Bid/Offer provides a pop-up window pre-populated with the selected deal name (and deal component name) with fields for quantity and amount to place a bid or offer.

4A-8 Left pane "Previous" button to view previous page of a Watch List.

4A-9 Left pane "Next" button to view next page of a Watch List.

4A-10 If the current Bid/Offering is not the users, the Place Bid/Offer pop-up window appears providing functions to place a bid or offer.

4A-11 If the current Bid/Offering is the users, the Modify Bid/Offer pop-up window appears providing functions to withdraw, modify the bid or offering.

4A-12 System evaluates whether a transaction exceeds the subscriber administrator's trade limit or day limit.

4A-13 If the transaction does exceed transaction limit the "Bid/Offer ID" must be entered.

4A-14 If the "Bid/Offer ID" is verified the transaction is processed.

4B-1 The right pane is populated with an alphabetical list of the user's current bids and offerings.

4C-1 The right pane is populated with an alphabetical list of all currently bids and offerings.

4D-1 Function presents an alphabetical list of all deals.

4D-2 Each deal has a Radio Button before the deal name to select the deals of interest.

4D-3 Each deal that has components has a "+/−" button following the deal name to expand the screen showing the components or collapse the screen hiding the components.

4D-4 Right Clicking a deal name presents a pop-up window presenting Deal Summary Information.

4D-5 With deal of interest selected the user can Save the selection for later review.

4D-6 If user clicks "Save" a pop-up window with the user's Watch Lists is presented.

4D-7 User can select an existing Watch List and click "Save" or click "Save" without selecting a Watch List. If the user does not select an existing Watch List, the user is prompted to name the new Watch List and click "Save" creating a new Watch List.

4D-8 If the user selects an existing Watch List, the user is asked for verification to add the selected deals to the selected Watch List.

4E-1 Search can be enabled by pre-determined parameters characteristic of the asset category. User can select any one or many of the parameters and/or combine predetermined parameters with user-definable parameters.

4E-2 Search can be enabled by user-determinable parameters characteristic of the asset category. User can select any one or many of the parameters and/or combine user definable parameters with pre-determined parameters.

4E-3 Pre-determined parameters, characteristic of the asset category, can refine a search by one to four degrees of refinement. Such as: 1) geographical location, 2) type of deal, 3) structure of deal, 4) currency of deal.

4E-4 User-definable parameters, characteristic of the asset category, are in three forms: free text, Boolean and lists. Boolean operators and list data are available in pull-down selection boxes.

4E-5 Search results populate "Deal Directory" screen with Deals of Interest with Radio Buttons selected facilitating ease of the Save function.

412 User Administration presents function for the subscriber administrator to manage Subscriber Entity users.

413 Subscriber Preferences presents functions for the subscriber administrator to manage Subscriber Entity preference settings.

414 User Authentication presents functions for the subscriber administrator to manage Subscriber Entity user use authorizations.

415 User Buy/Sell Preferences presents utility for the user to establish buy and sell parameters that when they are met the user is notified.

416 User Notification Preferences present utility for the user to choose the mode of notification for pre-determined events characteristic to the asset category.

4F1-1 Subscriber Administrator Login is necessary to access these functions.

4F1-2 Subscriber Administrator enters User Name, UserID and User's IP Address, and assigns the user to classifications of users.

4F2-1 Subscriber Administrator Login is necessary to access these functions.

4F2-2 Subscriber Administrator establishes how long Session Logs are to be maintained online: 1, 2 or 3 years and if desired.

4F2-3 Subscriber Administrator fill in Minutes entity wants before a Time Out.

4F2-4 Subscriber Administrator can enter entities to be excluded from dealing with Subscriber Administrator's Entity.

4F3-1 Subscriber Administrator Login is necessary to access these functions.

4F3-2 Subscriber Administrator establishes user level of authorization for each user.

4F3-3 Subscriber Administrator sets User's "Trade Limit" needing "Bid/OfferID" authorization and "Day Trade Limit".

4F4-1 User Utility for user to manage Buy and Sell preferences, if desired.

4F5-1 User Utility for user to manage Notifications and Mode of Notifications.

500 Notification Function automatically sends an e-mail notification and another notification via user's notification preferences on a Bid/Offer Match of quantity and price to both counterparties. The message contains deal information, such as, deal name, quantity, price, transaction date/time, counterparty name, counterparty entity and a link to confirm acceptance of the transaction.

600-1 If acceptance is not received from both counterparties by end of next business day after date of Notification, the system send email counterparties indicating failure of transaction acceptance.

600-2 If acceptance is received from both counterparties, system sends e-mail Acceptance Confirmation to both counterparties. This acceptance includes: counterparties' entity, name, address, contact information, deal name, quantity, price, and transaction date/time.

700 End of Day Function creates a report and e-mails it to each user active that day. Report includes all actions taken by the user that day, such as, bids, offers, modification, withdrawals, matched transactions, and accepted transactions.

800-1 On Login Failure Subscriber Administrator must reactivate the user's account by initiating system to reset the user's account by issuing a temporary password.

800-2 On next login user must change temporary password to new password.

800-3 On successful login User Privileges are assigned.

800-4 Next a Session Certificate Cookie is issued.

800-5 Next a Session Log is opened.

800-6 Next system checks for a "Last State" file. If one exists the system offers the user the "Last State" or a Fresh Session and access is given.

800-7 "Forgot Password?" provides function for user to gain access to system when password has been forgotten.
800-8 System issues Temporary Password and e-mails it to user's e-mail.
900-1 On Logoff Session Log is saved.
900-2 Session Log is saved to Session Archive.
900-3 On Logoff Session Certificate Cookie is canceled.
900-4 On Logoff "Last State" is saved.
1000 Auction Module Home Page—entry point for an English style auction.
1000-1 Submission Form for user to submit product for auction. Form contains necessary deal information for analyst review.
1000-2 Submission Form has ability to attach text files, such as, a) Deal File containing the legal description and details of the product, b) Guidelines File containing any guidelines surrounding the potential transaction, c) P&S Agreement (Purchase and Sale Agreement) to execute the transaction.
1000-3 Bidder's Auction Screen displaying all bids in highest bid to lowest bid order with the high bid and the user's bid color highlighted.
1000-4 Seller's Auction Screen displaying all bids in highest bid to lowest bid order with the high bid color highlighted. The seller can configure the view to show or hide identity of bidders.
1000-5 At End of Auction Seller is presented with a screen displaying all bids with the highest bid of each bidder marked with a "Radio Button" next to the bid. The Seller can choose to transact the deal with any bidder at their highest bid.
120-3 Point of entry to the Portfolio Management Engine (PME) Module home page providing secure, password based login and authentication process allowing access to authorized modules; and a registration process for the service.
1201 Dashboard displaying snapshot and asset allocation, plus buttons for all functions.
1202 Report Function
1203 Activity Function
1204 Accounts Function
1205 Maintenance Function
1206 Help Function
12A-1 Saves choices and parameters for reports as User Default.
12A-2 Resets report choices and parameter setting to User's Default or system default, if user default has not been established.
12A-3 Ability to choose and set format for reports.
12A-4 Ability to select accounts to be included in reports.
12A-5 Ability to select Benchmarks to be used in reports.
12A-6 Ability to set Target Allocations to be used in reports.
12A-7 Get Reports produces the first selected report in the report list.
12A-8 Print Current Report.
12A-9 Print All Reports.
12A-10 Print PDF of all reports.
12A-11 Download all report data to Excel format.
12A-12 Previous Report moves to previous report.
12A-13 Next Report moves to next report.
12B-1 Function to enter a transaction via a Transaction Form.
12B-2 Function to display transaction for an account.
12B-3 Clear function to clear Transactions Form.
12B-4 Function to record another transaction for the prior entry.
12B-5 Function to record a transaction input into the Transaction Form.
12B-6 Function to choose a transaction form for Stocks & Mutual Funds.
12B-7 Function to choose a transaction form for Options.
12B-8 Function to choose a transaction form for Fixed Income.
12B-9 Function to choose a transaction form for CDs.
12B-10 Function to choose a transaction form for Other Assets.
12B-11 Function to choose a transaction form for Cash.
12B-12 Function to calculate interest on a Fixed Income product.
12B-13 Function to update CD.
12B-14 Function to Lookup Symbol.
12B-15 Function to Edit Cost Basis.
12B-16 Function to Delete an Activity.
12B-17 Cancel function to abort deletion of an activity.
12B-18 Confirmation to delete marked activities.
12B-20 Search for a transaction.
12B-21 Transfer a Position to another account.
12B-22 Review Transfer Entries.
12B-23 Clear function to clear Transfer Form.
12B-24 Confirmation to transfer marked positions.
12B-26 Get Positions transferred between accounts.
12B-27 Enter Starting Positions.
12C-1 Subscriber Administrator can create a New Account.
12C-2 Subscriber Administrator can Delete an Account.
12C-3 Subscriber Administrator can Modify an Account.
12D-1 Subscriber Administrator can Edit a User Account.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A system for monitoring and transacting exempt securities or assets not otherwise listed, traded, valuated or bought/sold in any conventional exchange or system for the regulation of securities or commodities via a global information network, comprising:

memory for storing software and a processor for executing the software;

an asset analytic software module for statistically analyzing at least one exempt security or asset not otherwise listed, traded, valuated or bought/sold in any conventional exchange or system for the regulation of securities or commodities based upon a model selected by a user or a price data source selected by the user from a price data database;

an asset track software module for collecting at least one of price data, valuation data, and market data related to the at least one exempt security or asset not otherwise listed, traded, valuated or bought/sold in any conventional exchange or system for the regulation of securities or commodities asset being analyzed;

an asset information communication software module for providing the user inventory data of exempt securities or assets not otherwise listed, traded, valuated or bought/sold in any conventional exchange or system for the regulation of securities or commodities available to the user, accepting a selection of the at least one exempt security or asset not otherwise listed, traded, valuated or bought/sold in any conventional exchange or system for the regulation of securities or commodities from the user, providing the user at least one of the price data, the valuation data, and the market data related to the at least one exempt security or asset not otherwise listed, traded, valuated or bought/sold in any conventional exchange or system for the regulation of securities or commodities from the asset track software module, interfacing with the asset analytic software module for statistically analyzing the at least one exempt security or asset not otherwise listed, traded, valuated or bought/sold in any conventional exchange or system for the regulation of securities or commodities, and providing the user a result of the statistical analysis related to the at least one exempt security or asset not otherwise listed, traded, valuated or bought/sold in any conventional exchange or system for the regulation of securities or commodities; and an asset access software module for providing transactional access to conduct at least one of bidding to buy, offering to sell and auctioning transactions in connection with the at least one exempt security or asset not otherwise listed, traded, valuated or bought/sold in any conventional exchange or system for the regulation of securities or commodities being analyzed.

2. A system according to claim 1, wherein the asset analytic software module includes a data modeling structure in which quantitative factors and qualitative factors are inputted to generate a weighted sum average representative of each of the at least one exempt security or asset not otherwise listed, traded, valuated or bought/sold in any conventional exchange or system for the regulation of securities or commodities being analyzed.

3. A system according to claim 2, wherein the quantitative factors include at least one of financial data from a known financial information source and valuation data from a known valuation information source.

4. A system according to claim 2, wherein the qualitative factors include at least one of precepts known about, a type of, +/− VAR risk valuation of, and Q-factors of each of the at least one exempt security or asset not otherwise listed, traded, valuated or bought/sold in any conventional exchange or system for the regulation of securities or commodities.

5. A system according to claim 2, wherein the qualitative factors and the quantitative factors form 50% of the weighted sum average, respectively.

6. A system according to claim 2, wherein the asset analytic software module provides a plurality of data modeling structures and allows the user to select at least one of the data modeling structure.

7. A system according to claim 2, wherein the asset analytic software module provides a default data modeling structure and allows the user to modify the default data modeling structure.

8. A system according to claim 7, wherein the asset analytic software module automatically saves the data modeling structure modified by the user.

9. A system according to claim 7, wherein the data modeling structure saved by the asset analytic software module is prohibited from being deleted.

10. A system according to claim 1, wherein the asset track software includes a database for storing at least one of the price data, the valuation data and the marketing data on the at least one exempt security or asset not otherwise listed, traded, valuated or bought/sold in any conventional exchange or system for the regulation of securities or commodities being analyzed.

11. A system according to claim 1, wherein the asset access software includes a notification function to notify a user in connection with a matching offer to sell, bid to buy or auction high bid in response to at least one of the bid to buy, offer to sell and auction transactions from the user.

12. A system according to claim 1, wherein the inventory data includes at least one of exempt securities or assets not otherwise listed, traded, valuated or bought/sold in any conventional exchange or system for the regulation of securities or commodities available across a network for the auctioning transactions.

13. A system according to claim 1, comprising a communications module for providing information of accessibility to the system to a user.

14. A system according to claim 13, wherein the communications module provides information regarding a status of a pending transaction to the user.

15. A system according to claim 13, wherein the communications module is an out-of-band communications module.

16. A system according to claim 1, comprising an authentication module for authenticating access to the system.

17. A system according to claim 1, wherein the asset access software module posts the bit on the condition that the bit is within a predetermined daily transactional limit of the user and within a predetermined per trade limit of the user.

18. A system according to claim 1, wherein the asset access software module posts the offer on the condition that the offer is within a predetermined daily transactional limit of the user and within a predetermined per trade limit of the user.

19. A system according to claim 1, comprising:
a portfolio management engine system (PMS); a portfolio management database;
a price or valuation data engine for determining whether inputted price data relates to a new exempt security or asset not otherwise listed, traded, valuated or bought/sold in any conventional exchange or system for the regulation of securities or commodities; and
a database of the price data or the valuation data,
wherein the price or valuation data engine creates a new record related to the new exempt security or asset not otherwise listed, traded, valuated or bought/sold in any conventional exchange or system for the regulation of securities or commodities in response to that the price or valuation data engine determines that the inputted price data or valuation data relates to the new exempt security or asset not otherwise listed, traded, valuated or bought/sold in any conventional exchange or system for the regulation of securities or commodities, and
wherein the price or valuation data database is updated in response to that the price data or the valuation data engine determines that the inputted price data or valuation data relates to the latest price data.

20. A system according to claim 19, wherein the price or valuation data engine randomly shuffles requests for price data or valuation data on a plurality of exempt securities or assets not otherwise listed, traded, valuated or bought/sold in any conventional exchange or system for the regulation of securities or commodities and distributes the requests among authorized price reporting sources and broker dealers to input the price data or the valuation data.

21. A method for monitoring and transacting exempt securities or assets not otherwise listed, traded, valuated or bought/sold in any conventional exchange or system for the regulation of securities or commodities via a global information network, comprising the steps of:

statistically analyzing by a computer at least one exempt security or asset not otherwise listed, traded, valuated or bought/sold in any conventional exchange or system for the regulation of securities or commodities based upon a model selected by a user or a price data source selected by the user from a price data database;

collecting by a computer at least one of price data, valuation data, and market data related to the at least one exempt security or asset not otherwise listed, traded, valuated or bought/sold in any conventional exchange or system for the regulation of securities or commodities being analyzed;

providing the user by a computer, inventory data of exempt securities or assets not otherwise listed, traded, valuated or bought/sold in any conventional exchange or system for the regulation of securities or commodities available to the user, accepting a selection of the at least one exempt security or asset not otherwise listed, traded, valuated or bought/sold in any conventional exchange or system for the regulation of securities or commodities from the user, providing the user at least one of the price data, the valuation data, and the market data related to the at least one exempt security or asset not otherwise listed, traded, valuated or bought/sold in any conventional exchange or system for the regulation of securities or commodities, and providing the user a result of the statistical analysis related to the at least one exempt security or asset not otherwise listed, traded, valuated or bought/sold in any conventional exchange or system for the regulation of securities or commodities; and providing by a computer transactional access to conduct at least one of bidding to buy, offering to sell and auctioning transactions in connection with the at least one exempt security or asset not otherwise listed, traded, valuated or bought/sold in any conventional exchange or system for the regulation of securities or commodities asset being analyzed.

22. A method according to claim 21, wherein the step of statistically analyzing at least one exempt security or asset not otherwise listed, traded, valuated or bought/sold in any conventional exchange or system for the regulation of securities or commodities comprises the step of configuring a data modeling structure in which quantitative factors and qualitative factors are inputted to generate a weighted sum average representative of the at least one exempt security or asset not otherwise listed, traded, valuated or bought/sold in any conventional exchange or system for the regulation of securities or commodities being analyzed.

23. A method according to claim 21, wherein the quantitative factors include at least one of financial data from a known financial information source and valuation data from a known valuation information source.

24. A method according to claim 21, comprising the step of storing at least one of the price, the valuation data and the marketing data on the at least one exempt security or asset not otherwise listed, traded, valuated or bought/sold in any conventional exchange or system for the regulation of securities or commodities being analyzed in a database.

25. A method according to claim 21, comprising the step of notifying the user in connection with a matching offer to sell, bid to buy or auction high bid in response to at least one of the bid to buy, offer to sell and auction transactions from the user.

26. A method according to claim 21, wherein the inventory data includes at least one exempt security or asset not otherwise listed, traded, valuated or bought/sold in any conventional exchange or system for the regulation of securities or commodities available across a network for the auctioning transactions.

27. A method according to claim 21, comprising the step of providing information about a status of transactional accessibility to at least one of inventory data of exempt securities or assets not otherwise listed, traded, valuated or bought/sold in any conventional exchange or system for the regulation of securities or commodities available to a user, the price data, the valuation data, the marketing data, a result of the statistical analysis on the at least one exempt security or asset not otherwise listed, traded, valuated or bought/sold in any conventional exchange or system for the regulation of securities or commodities.

28. A method according to claim 21, comprising the step of providing information about transactional accessibility.

29. A method according to claim 21, comprising the step of providing information about a status of a pending transaction to the user.

30. A method according to claim 21, comprising the step of authenticating access to at least one of inventory data of exempt securities or assets not otherwise listed, traded, valuated or bought/sold in any conventional exchange or system for the regulation of securities or commodities available to the user, the price data, the valuation data, the market data, and a result of the statistical analysis on the at least one exempt security or asset not otherwise listed, traded, valuated or bought/sold in any conventional exchange or system for the regulation of securities or commodities and the transactional access.

31. A method according to claim 21, wherein the qualitative factors include at least one of precepts known about, a type of, +/− VAR risk valuation of, and Q-factors of each of the at least one exempt security or asset not otherwise listed, traded, valuated or bought/sold in any conventional exchange or system for the regulation of securities or commodities.

32. A method according to claim 21, wherein the qualitative factors and the quantitative factors form 50% of the weighted sum average, respectively.

33. A method according to claim 21, comprising the steps of providing a plurality of data modeling structures and allowing the user to select at least one of the data modeling structure.

34. A method according to claim 21, comprising the steps of providing a default data modeling structure and allowing the user to modify the default data modeling structure.

35. A method according to claim 34, comprising the step of automatically saving the data modeling structure modified by the user.

36. A method according to claim 35, wherein the data modeling structure saved is prohibited from being deleted.

37. A method according to claim 21, wherein a bit is posted on the condition that the bit is within a predetermined daily transactional limit of the user and within a predetermined per trade limit of the user.

38. A method according to claim 21, wherein an offer is posted on the condition that the offer is within a predetermined daily transactional limit of the user and within a predetermined per trade limit of the user.

39. A method according to claim 21, comprising the steps of inputting the price data or the valuation data;

determining whether the inputted price data or the valuation data relates to a new exempt security or asset not otherwise listed, traded, valuated or bought/sold in any conventional exchange or system for the regulation of securities or commodities;

creating a new record related to the new exempt security or asset not otherwise listed, traded, valuated or bought/sold in any conventional exchange or system for the regulation of securities or commodities in a price data database in response to that it is determined that the inputted price data or valuation data relates to the new exempt security or asset not otherwise listed, traded, valuated or bought/sold in any conventional exchange or system for the regulation of securities or commodities, and updating the price data or valuation database in response to that it is determines that the inputted price data or valuation data relates to the latest price data.

40. A method according to claim 21, comprising the steps of randomly shuffling requests for price data or valuation data on a plurality of exempt securities or assets not otherwise listed, traded, valuated or bought/sold in any conventional exchange or system for the regulation of securities or commodities and distributing the requests among authorized price reporting sources and broker dealers to input the price data the valuation data.

* * * * *

UNITED STATES PATENT AND TRADEMARK OFFICE
CERTIFICATE OF CORRECTION

PATENT NO. : 7,526,444 B2
APPLICATION NO. : 11/143710
DATED : April 28, 2009
INVENTOR(S) : Douglas Miles et al.

It is certified that error appears in the above-identified patent and that said Letters Patent is hereby corrected as shown below:

In the Claims:

In Column 22, line 26 "bit" should read -- bid -- in both instances of the word "bit";

In Column 24, line 52 "bit" should read -- bid --;

In Column 24, line 53 "bit" should read -- bid --.

Signed and Sealed this

Ninth Day of June, 2009

JOHN DOLL
*Acting Director of the United States Patent and Trademark Office*